United States Patent
Hikichi

(10) Patent No.: US 8,190,825 B2
(45) Date of Patent: May 29, 2012

(54) ARITHMETIC PROCESSING APPARATUS AND METHOD OF CONTROLLING THE SAME

(75) Inventor: Toru Hikichi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 103 days.

(21) Appl. No.: 12/805,691

(22) Filed: Aug. 13, 2010

(65) Prior Publication Data

US 2010/0312968 A1 Dec. 9, 2010

Related U.S. Application Data

(63) Continuation of application No. PCT/JP2008/052652, filed on Feb. 18, 2008.

(51) Int. Cl.
*G06F 12/00* (2006.01)

(52) U.S. Cl. ........................................ 711/137

(58) Field of Classification Search .................. None
See application file for complete search history.

(56) References Cited

U.S. PATENT DOCUMENTS

| 6,470,427 B1* | 10/2002 | Arimilli et al. ................ 711/137 |
| 2006/0026362 A1 | 2/2006 | Yamazaki |
| 2006/0026363 A1 | 2/2006 | Yamazaki |
| 2006/0026366 A1 | 2/2006 | Yoshizawa et al. |
| 2006/0026594 A1 | 2/2006 | Yoshida et al. |

FOREIGN PATENT DOCUMENTS

| JP | 2006-40090 | 2/2006 |
| JP | 2006-40141 | 2/2006 |
| JP | 2006-48181 | 2/2006 |
| JP | 2006-48182 | 2/2006 |

OTHER PUBLICATIONS

International Search Report for PCT/JP2008/052652, mailed Apr. 8, 2008.

* cited by examiner

*Primary Examiner* — Hiep Nguyen
(74) *Attorney, Agent, or Firm* — Staas & Halsey LLP

(57) ABSTRACT

A common L2 cache unit of a CPU constituting a multicore processor, in addition to a PFPORT arranged for each CPU core unit, has a common PFPORT shared by the plurality of the CPU core units. The common PFPORT secures an entry when the prefetch request loaded from the PFPORT into a L2 pipeline processing unit fails to be completed. The uncompleted prefetch request is loaded again from the common PFPORT to the L2 pipeline processing unit.

8 Claims, 17 Drawing Sheets

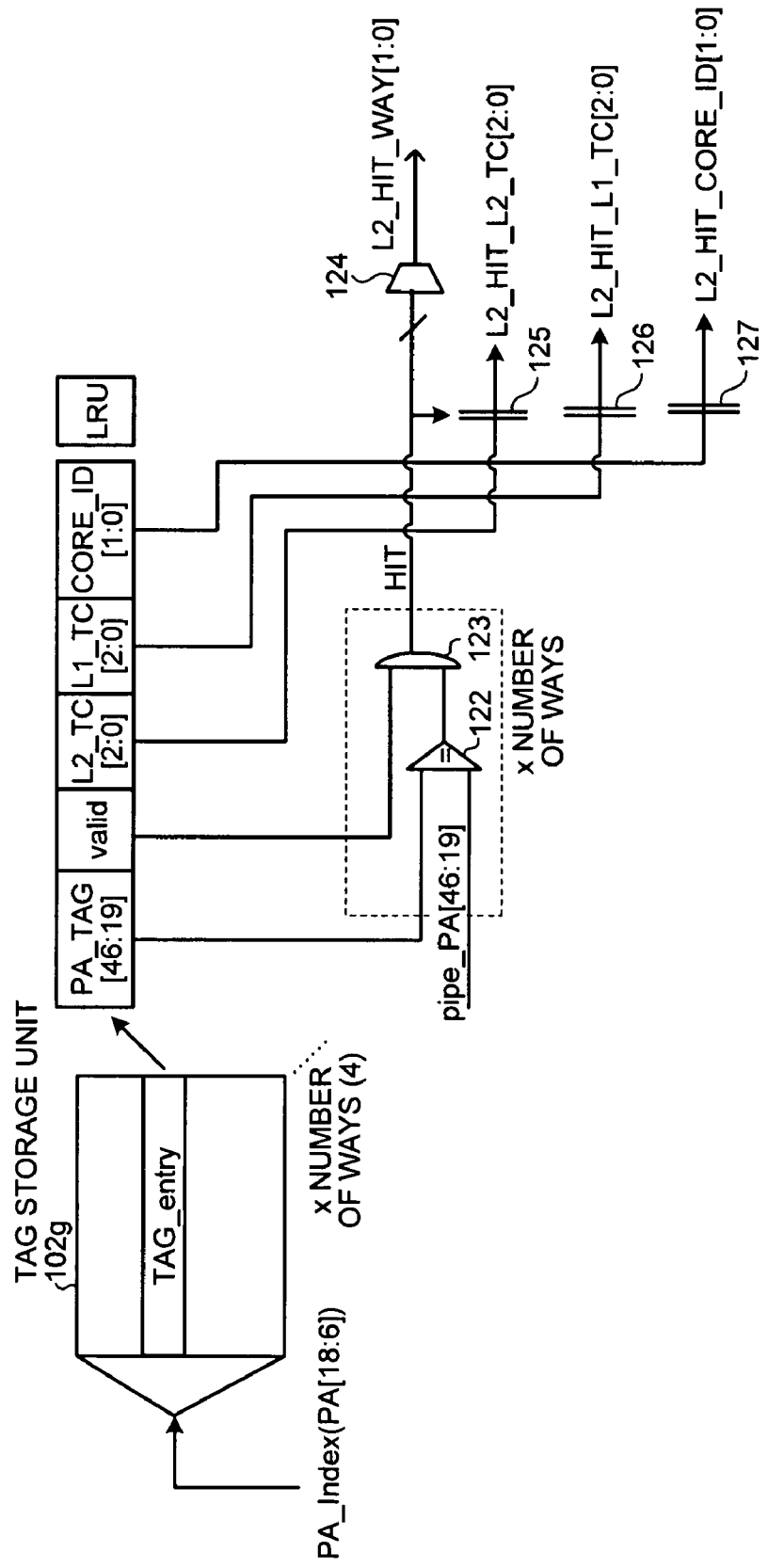

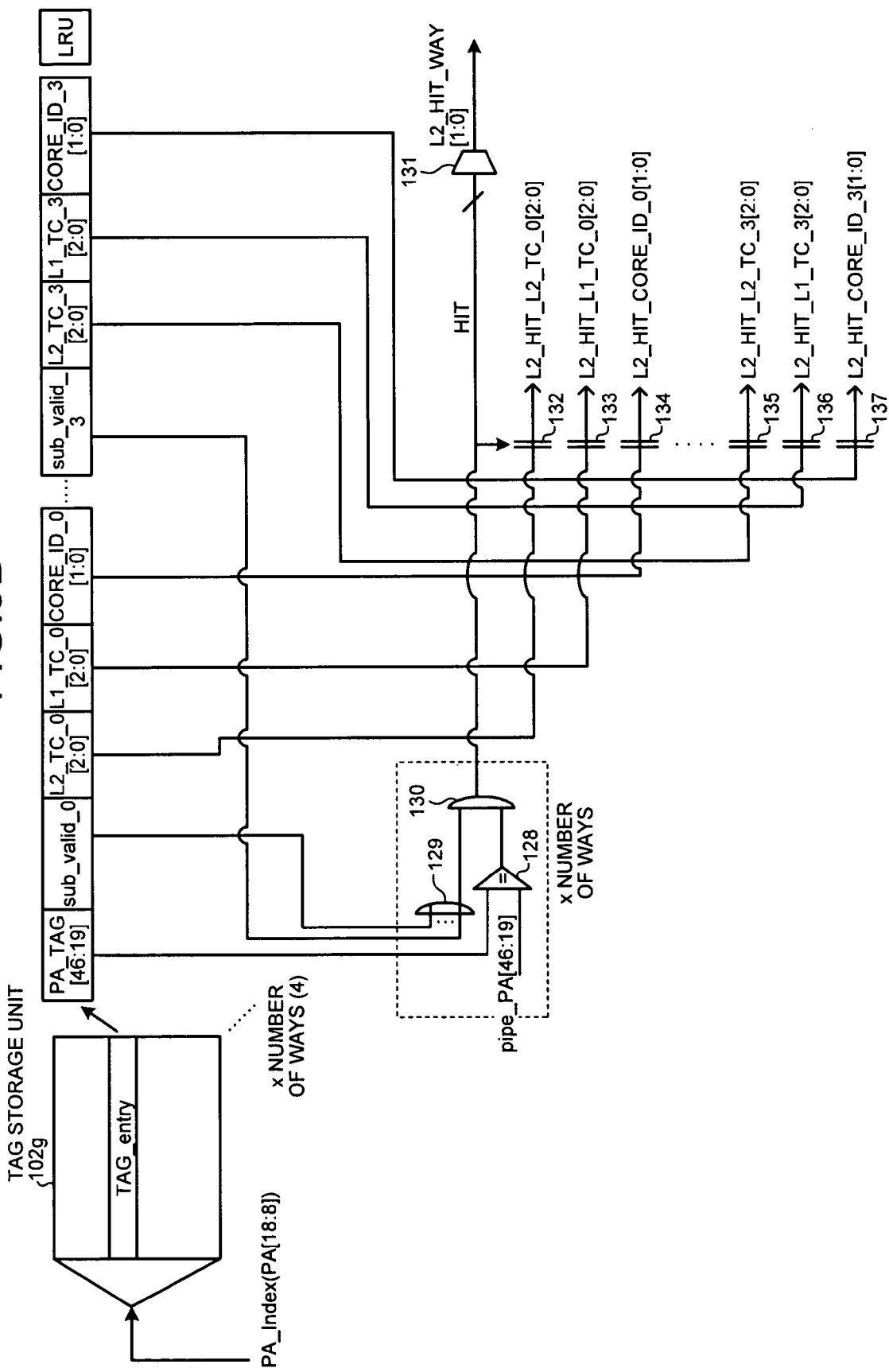

FIG.10D

L2_replace_pipeline

| REQUEST priority FROM L2-LB | SECURE priority | INPUT TAG READ ADDRESS | TAG READ OPERATION | DETECT TAG_mch & hit | DETERMINE replace_pipeline PROCESS | TRANSFER cmp (COMPLETION) OR abt TO L2-LB | L2-LB RAISE REPLACE COMPLETION FLAG |
|---|---|---|---|---|---|---|---|
| | | | DETECT L2-LB ADDRESS COINCIDENCE | | | INPUT TAG UPDATE ADDRESS | |

ARITHMETIC PROCESSING APPARATUS AND METHOD OF CONTROLLING THE SAME

CROSS-REFERENCE TO RELATED APPLICATION

This application is a continuation of International Application No. PCT/JP2008/052652, filed on Feb. 18, 2008, the entire contents of which are incorporated herein by reference.

FIELD

The embodiment discussed herein is directed to an arithmetic processing apparatus and a method of controlling the arithmetic processing apparatus.

BACKGROUND

Generally, in an information processing system having a control processing unit such as a CPU (Central Processing Unit) as a processor, the data frequently used is stored in a cache memory separate from a main memory to improve the processing speed of the CPU.

The cache memory, though smaller in capacity than the main memory, can be accessed at a higher speed. The processing speed can be improved, therefore, with a cache memory built in a CPU having an arithmetic processing unit while the data from the arithmetic processing unit which is frequently used is replaced from time to time and stored in the cache memory.

Also, in order to further improve the processing speed, a plurality of cache memories are hierarchically arranged, and at the time of processing, the arithmetic processing unit of the CPU first accesses the primary cache (hereinafter referred to as "the L1 cache") accessible at the highest speed.

In the absence of the required data in the L1 cache (hereinafter referred to as "the L1 cache miss"), a demand request (hereinafter referred to as "the DM") is issued to the secondary cache (hereinafter referred to as "the L2 cache") to access the data involved in the L1 cache miss.

In order to improve the processing performance of a CPU, a plurality of CPU processor cores as processing units (hereinafter referred to as "the CPU cores") may be mounted on a single CPU providing an arithmetic unit.

In recent years, the use of an on-chip multicore processor has been extended as a multicore processor having a plurality of CPU cores mounted on one chip.

An on-chip multicore processor is generally so configured that an L1 cache is arranged in each CPU core and one L2 cache is shared by a plurality of CPU cores.

In this configuration with one L2 cache shared by a plurality of CPU cores, however, many accesses are liable to be concentrated on the L2 cache.

In view of this, a cache memory control device as disclosed in Japanese Laid-open Patent Publication No. 2006-40090, for example, has been proposed in which the accesses to the L2 cache are divided into the DM and a prefetch request (hereinafter referred to as "PF") to permit the CPU cores to predict and read the required data in advance, and in which the L2 cache is accessed through a dedicated port (MIPORT (Move In PORT) for DM and PFPORT (Pre Fetch Port) for PF) for each request in each CPU core.

According to the conventional technique represented by the aforementioned Japanese Laid-open Patent Publication No. 2006-40090 which is so packaged that the substantially whole PFs to the L2 cache are processed, however, the PF having failed to be completed for lack of resources, for example, is recharged into the PFPORT.

When vacant PFPORT entries are lacking, however, a waiting period is required before an entry becomes available, resulting in a lower throughput of the PFs as a whole.

SUMMARY

According to an aspect of an embodiment of the invention, a processor connected to a memory unit includes a first processing unit; a second processing unit; and a common cache memory control unit that controls a common cache memory shared by the first and second processing units. The first processing unit has a first cache memory and issues a prefetch request to selected one of the common cache memory and the memory unit to read the data into the first cache memory beforehand. The second processing unit has a second cache memory and issues a prefetch request to selected one of the common cache memory and the memory unit to read the data into the first cache memory beforehand. The common cache memory control unit includes a prefetch processing unit that processes the prefetch request to the common cache memory, a first prefetch memory unit that stores only the prefetch request from the first processing unit and issues the prefetch request from the first processing unit to the prefetch processing unit, a second prefetch memory unit that stores only the prefetch request from the second processing unit and issues the prefetch request from the second processing unit to the prefetch processing unit, and a common prefetch memory unit which, when the prefetch request issued from selected one of the first and second prefetch memory units to the prefetch processing unit cannot be completed, stores the uncompleted prefetch request in an entry and issues the uncompleted prefetch request to the prefetch processing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9A is a block diagram illustrating a tag matching circuit according to the non-subline system of the common L2 cache unit;

FIG. 9B is a block diagram illustrating a tag matching circuit according to the subline system of the common L2 cache unit;

FIG. 10D is a diagram illustrating an outline of the L2 replace pipeline process of the common L2 cache unit;

DESCRIPTION OF EMBODIMENTS

A preferred embodiment of the present invention will be explained with reference to accompanying drawings. The embodiment described below represents an arithmetic processing apparatus and a method of controlling the arithmetic processing apparatus in which a CPU having a plurality of CPU cores (hereinafter referred to as "the multicore processor") executes the process in collaboration with each other. A system including the arithmetic processing apparatus according to an embodiment described below is referred to as an information processing system.

Figure 1:
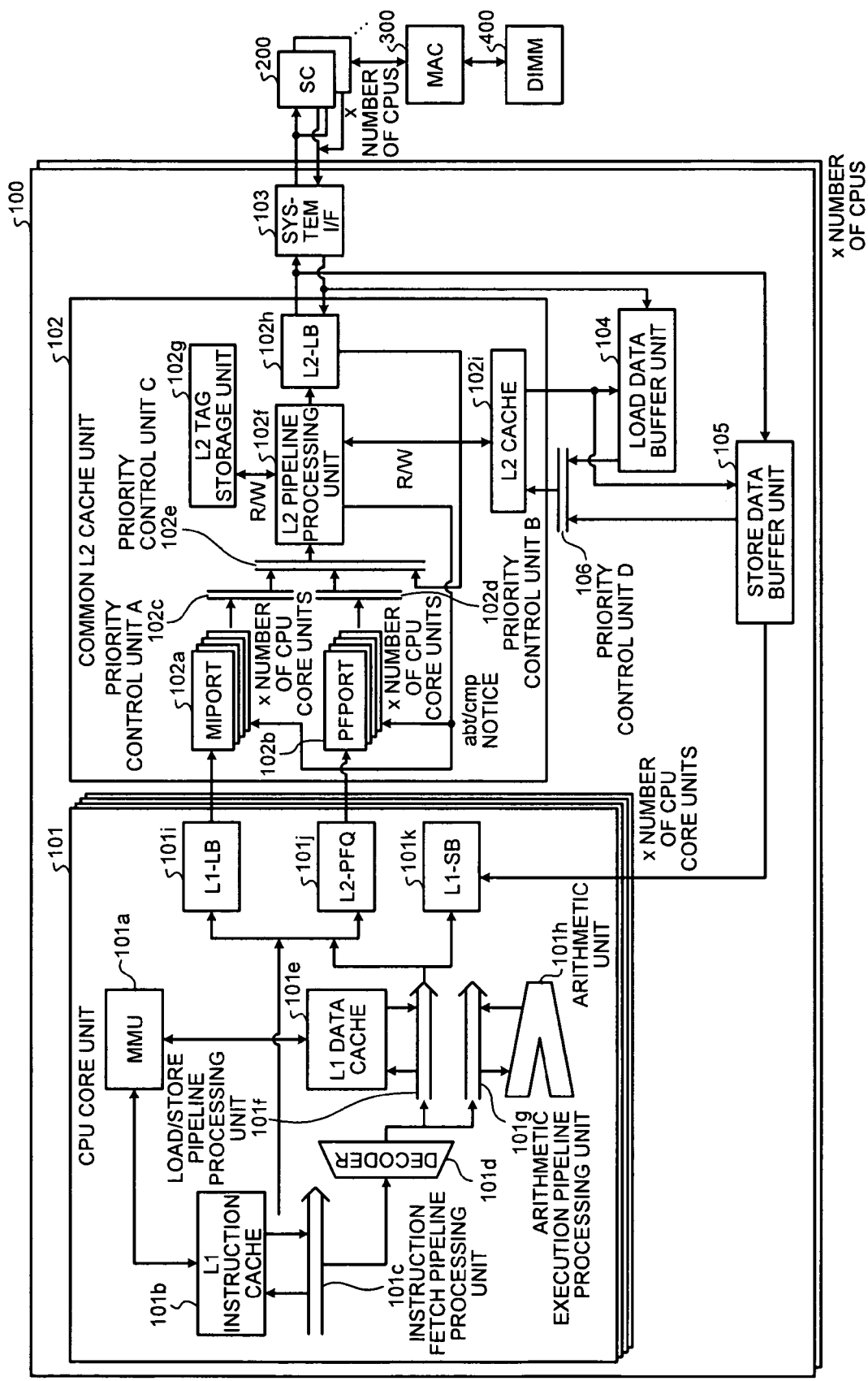
FIG. 1 is a block diagram illustrating a configuration of a conventional multicore processor.

First, the configuration of the conventional multicore processor is explained. FIG. 1 is a block diagram illustrating the configuration of the conventional multicore processor. In the description that follows, the multicore processor is referred to simply as "the CPU". As illustrated in FIG. 1, the conventional CPU 100 includes a plurality of CPU core units 101, a common L2 cache unit 102 providing a secondary common cache, a system I/F (interface) unit 103, a load data buffer unit 104, a store data buffer unit 105 and a priority control unit D 106. The plurality of the CPU core units 101 all have the same configuration, and therefore, the description below refers to only one of them.

In the information processing system, the CPU 100 is connected to an individual SC (System Controller) 200, which in turn is connected to one MAC (Memory Access Controller) 300. The MAC 300 controls the memory access to a DIMM (Dual Inline Memory Module) 400 providing a main storage unit.

Each CPU core unit 101 includes an MMU (Memory Management Unit) 101a for controlling the access to an L1 data cache 101e providing an L1 instruction cache providing a primary instruction cache for holding the instruction described later and the L1 data cache 101e providing a primary data cache for holding the data (which are hereinafter collectively referred to as "the L1 cache"), an L1 instruction cache 101b for storing a CPU instruction set (hereinafter referred to as "the instruction"), an instruction fetch pipeline processing unit 101c for processing by pipelining the instructions fetched from the L1 instruction cache 101b, the L1 data cache 101e for caching the data, a load/store pipeline processing unit 101f for controlling the data load/store operation with the L1 data cache 101e, an arithmetic execution pipeline processing unit 101g for controlling the arithmetic operation performed in an arithmetic unit 101h described later, the arithmetic unit 101h for performing the data arithmetic operation, an L1-LB (load buffer) 101i for registering, in the entry, the DM issued to the common L2 cache unit 102 upon occurrence of an L1 cache miss of the DM, an L2-PFQ (prefetch queue) 101j for registering, in the entry, the PF issued to the common L2 cache unit 102 upon occurrence of an L1 cache miss of the PF, and an L1-SB (store buffer) 101k for registering, in the entry, the instruction or the data stored in the common L2 cache unit 102 or the DIMM 400 described later from the L1 cache.

The common L2 cache unit 102 includes a plurality of MIPORTs (move-in ports) 102a corresponding to the plurality of the CPU core units 101, respectively, to accept and make an entry of the DM from the L1-LB 101i, a plurality of PFPORTs (prefetch ports) 102b corresponding to the plurality of the CPU core units 101, respectively, to accept and make an entry of the PF from the L2-PFQ 101j, a priority control unit A 102c for outputting a request by selecting one entry by priority control from the plurality of the MIPORTs 102a, a priority control unit B 102d for outputting a request by selecting one entry by priority control from the plurality of the PFPORTs 102b, a priority control unit C 102e for outputting one request by arbitration, by priority control, of the requests output from the priority control unit A 102c, the priority control unit B 102d and an L2-LB (load buffer) 102h described later, an L2 pipeline processing unit 102f for processing by pipelining the requests output from the priority control unit C 102e, an L2 tag storage unit 102g for storing the tag of the data stored in an L2 cache 102i described later, the L2-LB (load buffer) 102h for registering the data request to the DIMM 400 in an entry, when the data required by the request is absent in the L2 cache 102i described later (hereinafter referred to as "the L2 cache miss") as the result of searching the L2 tag storage unit 102g by the L2 pipeline processing unit 102f, the L2-LB (load buffer) 102h for registering, in an entry, the data request to the DIMM 400, and the L2 cache 102i for caching the data.

Specifically, when the instruction fetch for the L1 instruction cache 101b is missed or the data operation instruction (the data load, the data store, etc.) for the L1 data cache 101e is missed, then the DM occurs for the L2 cache 102i and the request is issued to the MIPORT 102a.

Also, the PF is automatically issued in hardware to the PFPORT 102b based on the software prefetch based on the software request, the prediction of the instruction fetch based on the branch prediction or the regularity of the address for data access. By advance reading of the data required for the process by the CPU 100 in this way, the throughput of the CPU 100 is improved.

The MIPORT 102a that has accepted the DM and the PFPORT 102b that has accepted the PF issue the pipeline process request to the pipeline processing unit 102f. The priority control units including A 102 to C 102e, after selecting the request in accordance with the algorithm such as LRU (Least Recently Used) for each CPU core unit 101, select the priority of the request type as a fixed priority. For example, the priority of order is determined for the requests from the L2-LB 102h, the MIPORT 102a and the PFPORT 102b. As a result, the deadlock or the livelock can be prevented by upgrading the priority of the request after the pipeline process. The request with the priority thereof secured is processed by pipelining in the L2 pipeline processing unit 102f.

The L2 pipeline processing unit 102f reads the tag attached to the request, and based on the result of searching the L2 tag storage unit 102g and the result of address matching with the data designated by the request entered in the L2-LB 102h, determines the contents of the process. When the pipeline process fails to be completed by some reason or other, the particular pipeline process is determined as invalid as "abt" (abort or process suspension). When the pipeline process can be completed normally, "cmp" (complete or normal completion) is determined.

After the pipeline process, the tag stored in the L2 tag storage unit 102g is updated as required, and the result of the pipeline process (abt or cmp) is notified to the L2-LB 102h, the MIPORT 102a and the PFPORT 102b. Once the pipeline processing unit 102f notifies the L2-LB 102h that the request to the system is required due to the L2 cache miss of DM or PF, the data request (sc_request, hereinafter referred to as "sc_req") is issued, through the system I/F unit 103, to the SC 200 included in each CPU.

The SC 200 that has received "sc_req" has a copy of the tag stored in all the CPUs 100 on the system. The SC 200 determines the process for "sc_req" in accordance with the result of retrieving the tag copy, and supplies the L2-LB 102h with an sn_res response (snoop response) to sc_req.

When the cache line providing the unit of data transfer to the cache is 256 bytes and the cache line is configured of four 64-byte sublines, the sn_res response has two types including sn_res_64 and sn_res_256. The response sn_res_64 notifies that the SC 200 has determined the data transfer for one subline corresponding to sc_req. The response sn_res_256, on the other hand, notifies that the SC 200 has determined the data transfer for all the cache lines including one subline corresponding to sc_req.

Specifically, when any one of the sublines of sc_req is held by the CPU 100, the SC 200 determines sn_res_64 (64-byte transfer). When none of the CPUs 100 holds all the sublines of sc_req but only the DIMM 400, on the other hand, the SC 200 determines sn_res_256 (256-byte transfer).

The L2-LB 102h that has received the response sn_res requests the replace pipeline (L2_replace_pipeline) as required. The replace pipeline process is explained later with reference to FIG. 10D.

The SC 200, ready for the data transfer requested by the CPU 100, gives a "dow" (Data Output Warning) response to the CPU 100. The L2-LB 102h of the CPU 100, upon reception of the "dow" response, requests the starting of the tag entry pipeline process and the data write pipeline process. The tag entry pipeline process and the data write pipeline process are explained later with reference to FIGS. 10E and 10F.

When the data corresponding to the "down" response is the data for the DM, the particular data is transmitted to the CPU core unit 101 through the load data buffer unit 104. In synchronism with the data write pipeline process, the data is written also in the L2 cache 102i through the load data buffer unit 104. When the tag attached to the DM is stored in the L2 tag storage unit 102g (hereinafter referred to as "the L2 cache hit"), on the other hand, the data is read from the L2 cache 102i by the pipeline processing unit 102f, and transferred to the CPU core unit 101 through the load data buffer unit 104.

The priority control unit D 106, in writing the data into the L2 cache 102i, controls the priority between the load data sent from the SC 200 through the load data buffer unit 104 and the store data sent from the L1-SB 101k of the CPU core unit 101 through the store data buffer unit 105.

Next, an explanation is given about the PF control operation in the presence of the response sn_res_256 of the SC 200 for the L2 cache miss of the PF or the response sn_res_256 of the SC 200 in the common L2 prefetch control operation. The cache line has four 64-byte sublines (sublines 0 to 3) for the total of 256 bytes. The pipeline process for PF is hereinafter referred to as "the PF pipeline process".

Figure 2A:
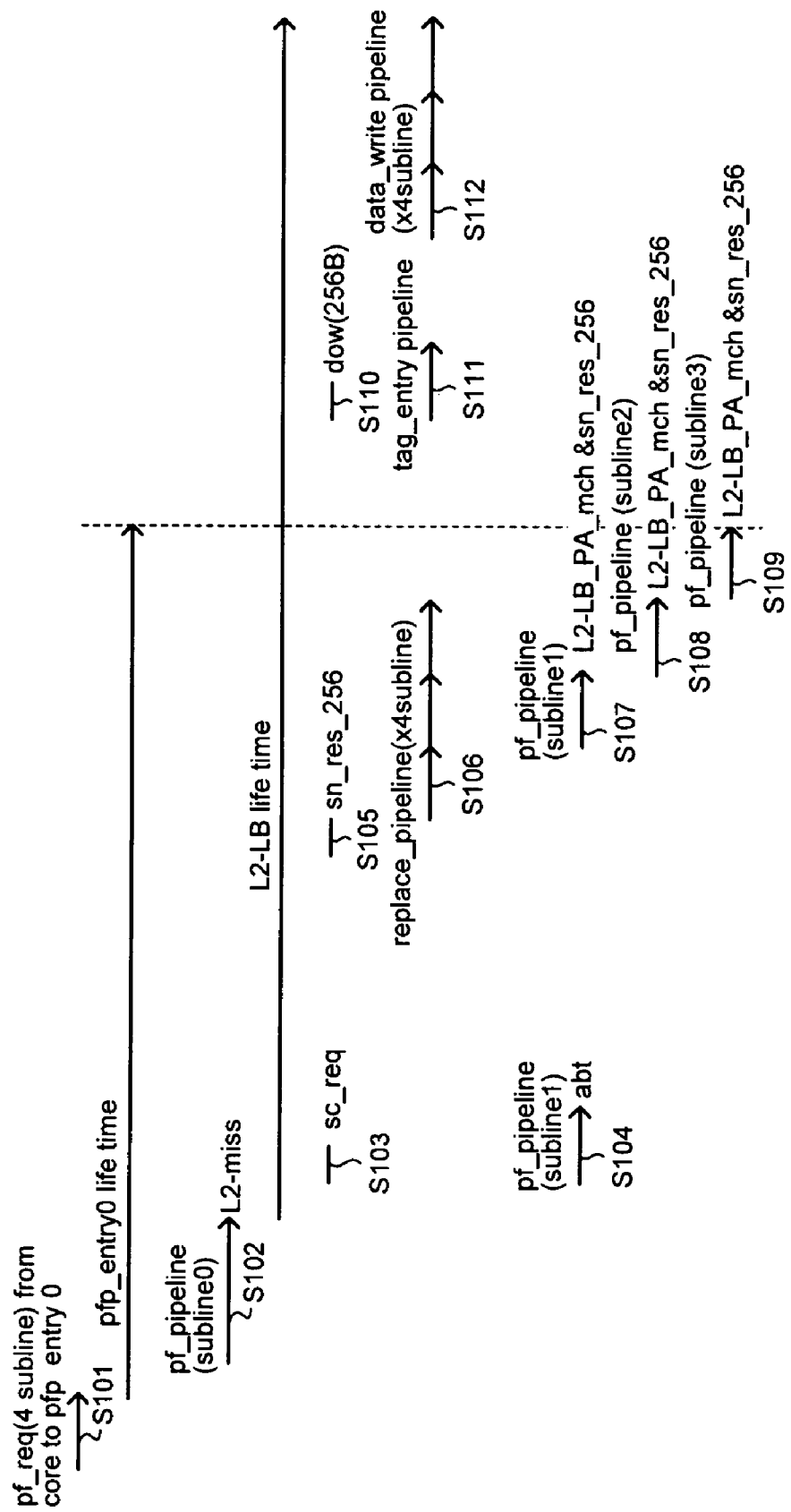
FIG. 2A is a timing chart illustrating a case in which the SC responds with sn_res_256 to the L2 cache miss of the PF in the common L2 prefetch control operation.

First, refer to FIG. 2A. FIG. 2A is a timing chart illustrating a case in which the SC 200 gives the response sn_res_256 for the L2 cache miss of PF in the common L2 prefetch control operation. The CPU core unit 101 outputs the PF to the PFPORT 102b of the corresponding common L2 cache unit 102 (pf_req(4subline) from Core to pfp entry0, step S101). Incidentally, each request may involve the output of four sublines or the sublines may be output in four divisions.

The PFPORT 102b that has received the PF turns on all the valid flags (sub_valid[0] to sub_valid[3]) corresponding to the sublines 0 to 3. The expression "pfp_entry0 life time" indicates the period from the time when "entry0" of the PFPORT 102b is occupied by the PF to the time when it is released. In the meantime, at least one valid flag of the sublines 0 to 3 is in on state.

Then, the PFPORT 102b that has received the PF issues a priority request to the pipeline processing unit 102f for subline 0. Once the priority is secured in the pipeline processing unit 102f, the PF pipeline process indicated by "pf_pipeline (subline0)" is executed (step S102). The PF pipeline process takes about 10 CPU cycles.

When the result of searching the L2 tag storage unit 102g during the PF pipeline process indicates that both the 256-byte cache line and the 64-byte subline are a L2 cache miss for the tag attached to the PF, then the entry of the L2-LB 102h is secured after the PF pipeline process. Since the PF pipeline process of subline 0 is completed, the valid flag (sub_valid[0]) of the subline 0 of the PFPORT 102b is turned off.

Further, the data request "sc_req" from the L2-LB 102h to the system is issued to the SC 200 (step S103). Since the PF pipeline process for subline 0 is completed, the PFPORT 102b next issues a priority request to the pipeline processing unit 102f for subline 1. Once the priority is secured, the PF pipeline process for subline 1 is executed (step S104).

During the PF pipeline process, the result of searching the L2 tag storage unit 102g indicates that both the 256-byte cache line and the 64-byte subline for the tag attached to the PF are a L2 cache miss, and the address matching of the 256-byte cache line (matching of the cache line address) is detected in the L2-LB 102h.

Since the snoop response called sn_res has yet to return from the SC 200, however, the PF pipeline process of subline 1 cannot be completed, and an "abt" notice is given from the L2 pipeline processing unit 102f to the PFPORT 102b while the valid flag (sub_valid[01]) of the entry for subline 1 of the PFPORT 102b remains on.

The repetitive execution of the same PF pipeline process before sn_res response returns results in wasteful repetition of "abt". Therefore, the command to turn on the waiting flag (wt_flag) of the entry corresponding to subline 1 of the PFPORT 102b is sent by the SC 200f to the PFPORT 102b at the same time as the "abt" notice. The reason why the repetition of the aforementioned process is wasteful is that the repetitive execution of the "abt" process in the PF pipeline hampers the pipeline process which otherwise could be executed in response to the request from other CPU core units 101 and power is consumed wastefully.

As the result of the process in the SC 200, the signal sn_res_256 (notifying the determination to give a 256-byte data response) is returned from the SC 200 to the L2-LB 102h (step S105). The time from the request sc_req to the response sn_res is normally about 200 to 400 CPU cycles. With sn_res_256 response as a motive, the notice to turn off the waiting flag (wt_flg) is given from the L2-LB 102h to the PFPORT 102b.

The L2-LB 102h that has received the sn_res_256 notice from the SC 200 gives a request to start the replace pipeline (replace_pipeline) process. Specifically, when the L2 cache miss for the 256-byte cache line exists and all the WAYs (the DM or PF entries registered in the L2-LB 102h) are valid, the PF is required to drive out any one of the WAYs. The WAY to be driven out is determined by the LRU algorithm at the time of the PF pipeline process corresponding to the first subline 0.

The replace pipeline process is executed only for the valid one of the sublines of the WAY driven out (step S106). As long as the four sublines of the WAY are all valid, the replace subline process is executed four times, while in the absence of a valid subline in the WAY, on the other hand, the replace subline process is not executed.

The PFPORT 102b that has received the notice to turn off the waiting flag (wt_flg) requests the pipeline process corresponding to subline 1 again, and the PF pipeline process is executed (step S107). As the result of this process, it is determined that both the 256-byte cache line and the 64-byte subline are the L2 cache miss, and the sn_res_256 response has already reached the L2-LB 102h, so that the address matching in the 256-byte cache line units is detected in the L2-LB 102h.

The fact that the sn_res_256 response has already reached the L2-LB 102h indicates that the data response is made also for subline 1. Thus, the L2-LB 102h sends a completion notice (cmp) of the PF pipeline process for subline 1 to the PFPORT 102b, which turns off the valid flag (sub_valid[01]) corresponding to subline 1.

In similar fashion, the PF pipeline process for sublines 2 and 3 is also completed (steps S108, S109), and the PFPORT 102b turns off the valid flag (sub_valid[3]) corresponding to subline 3 while at the same time releasing the entry of the particular PF of the PFPORT 102b.

At about the time of the sn_res_256 response, the SC 200 gives a data request for the address to the MAC 300 and, after preparing the data, gives a "dow" notice to the CPU 100 together with the 256-byte data (step S110). Upon reception of the "dow" header, the tag entry pipeline (tag_entry_pipeline) process is requested from the L2-LB 102h to the L2 pipeline processing unit 102f, and once the priority is secured, the tag entry pipeline process is executed (step S111). In the tag entry pipeline process, the tag of the WAY secured on the replace pipeline process is written in the L2 tag storage unit 102g at a time for the four sublines of the particular WAY.

The L2-LB 102h, upon reception of the "dow" data portion from the SC 200, requests the L2 pipeline processing unit 102f to execute the data write pipeline process for the WAY secured in the replace pipeline process, in the order of complete data reception for sublines 0 to 3, and the data write pipeline process is executed (step S112). Upon total completion of the data write pipeline process, the entry of the L2-LB 102h is released.

Figure 2B:
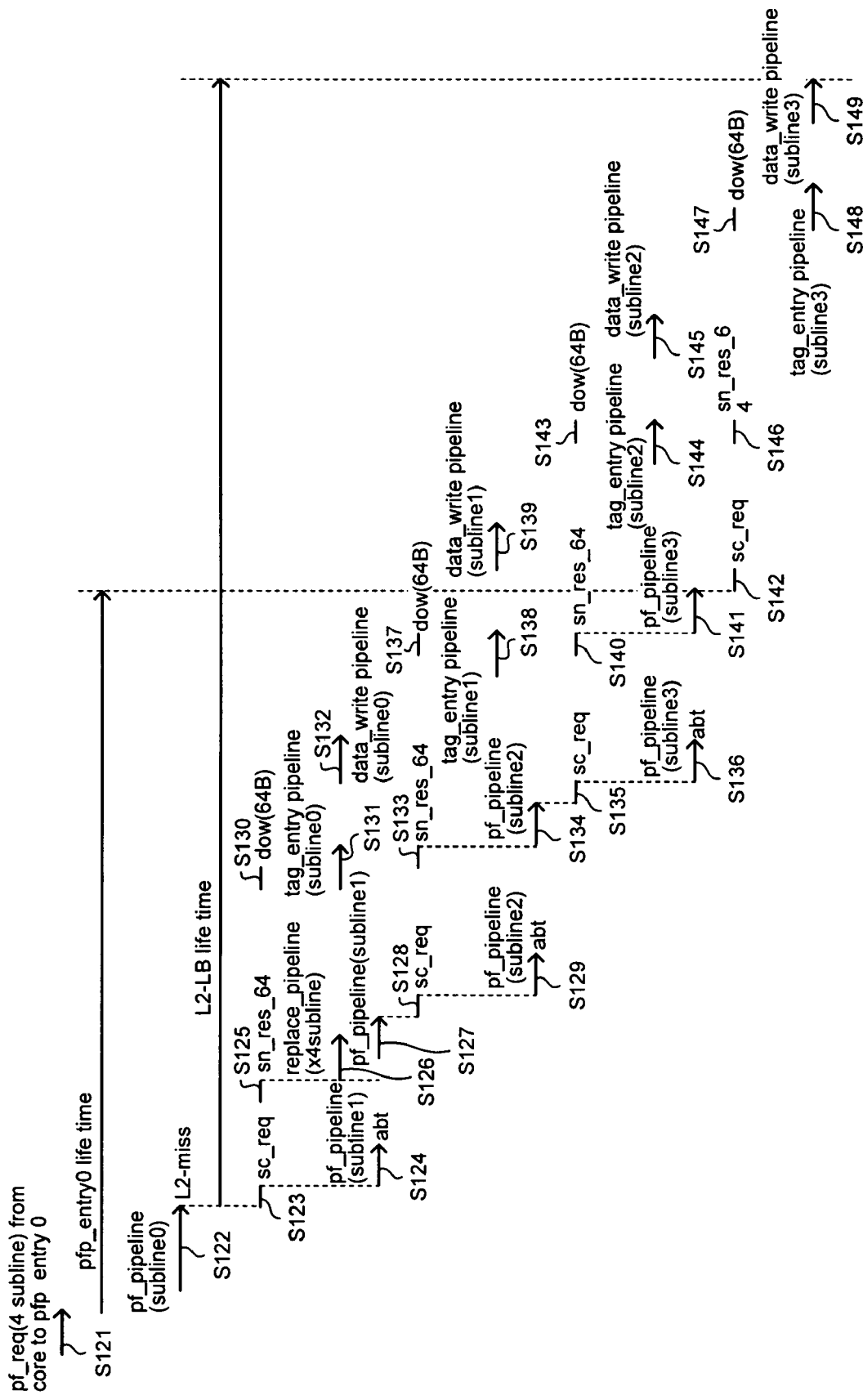
FIG. 2B is a timing chart illustrating a case in which the SC responds with sn_res_64 to the L2 cache miss of the PF in the common L2 prefetch control operation.

Next, refer to FIG. 2B. FIG. 2B is a timing chart illustrating a case in which a response is given from the SC 200 with sn_res_64 for the L2 cache miss in the common L2 prefetch control operation. First, the CPU core unit 101 outputs the PF to the PFPORT 102b of the corresponding common L2 cache unit 102 (pf_req(4sublines) from Core to pfp entry0, step S121). Four sublines may be output at a single request or in four divisions.

The PFPORT 102b that has received the PF turns on all the valid flags (sub_valid[0] to sub_valid[3]) corresponding to sublines 0 to 3. The expression "pfp_entry0 life time" indicates the period before "entry0" of the PFPORT 102b is occupied and released by the particular PF. In the meantime, at least one of the valid flag of sublines 0 to 3 is in on state.

Then, the PFPORT 102b that has received the PF issues a priority request to the pipeline processing unit 102f for subline 0. Once the priority is secured in the pipeline processing unit 102f, the PF pipeline process indicated by "pf_pipeline (subline0)" is executed (step S122). The PF pipeline process is executed in about 10 CPU cycles.

Assume that the result of searching the L2 tag storage unit 102g during the PF pipeline process indicates that both the 256-byte cache line and the 64-byte subline are a L2 cache miss for the tag attached to the PF. Then, after the PF pipeline process, the entry of the L2-LB 102h is secured. Since the PF pipeline process for subline 0 is completely secured, the valid flag of subline 0 of the PFPORT 102b (sub_valid[0]) is turned off.

Further, the signal sc_req constituting the data request for the system is issued from the L2-LB 102h to the SC 200 (step S123). Since the PF pipeline process of subline 0 is completed, the PFPORT 102b next issues a priority request to the pipeline processing unit 102f for subline 1. Once the priority is secured, the PF pipeline process for subline 1 is executed (step S104).

As the result of searching the L2 tag storage unit 102g during the PF pipeline process, both the 256-byte cache line and the 64-byte subline for the tag attached to the PF are found to be a L2 cache miss, and the address matching of the 256-byte cache line is detected in the L2-LB 102h at the same time.

Since the response called sn_res has yet to return from the SC 200, however, the PF pipeline process for subline 1 cannot be completed, and the "abt" notice is given from the L2 pipeline processing unit 102f to the PFPORT 102b, and the valid flag (sub_valid[01]) of the entry corresponding to subline 1 of the PFPORT 102b remains in on state.

As the result of the process executed in the SC 200, the signal "sn_res_64" (notifying the determination to give the 64-byte response) is returned from the SC 200 to the L2-LB 102h (step S125). The time required from sc_req to sn_res is normally about 200 to 400 CPU cycles. With the sn_res_64 response as a motive, the waiting flag (wt_flg) of the entry is turned off by the PFPORT 102b based on the command from the L2-LB 102h.

The L2-LB 102h that has received the sn_res_64 notice from the SC 200 requests the starting of the replace pipeline (replace_pipeline) process. Specifically, when the 256-byte cache line has an L2 cache miss and all the WAYs (the DM or PF entries registered in the L2-LB 102h) are valid, any one of the WAYs is required to be driven out. The WAY to be driven out is determined according to the LRU algorithm at the time of the PF pipeline process corresponding to the first subline 0.

Then, the replace pipeline process is executed only for the valid one of the sublines of the WAY driven out (step S126). When all the four sublines of the WAY are valid, the replace pipeline process is executed four times, while in the absence of a valid subline in the WAY, on the other hand, no replace pipeline process is executed.

The PFPORT 102b notified to turn off the waiting flag (wt_flg) requests again the PF pipeline process corresponding to subline 1, and the PF pipeline process is executed (step S127). As the result of this process, both the 256-byte cache line and 64-byte sublines are found to be the L2 cache miss while at the same time detecting that the sn_res_64 response has already reached the L2-LB 102h, and the address matches in units of 256-byte cache line in the L2-LB 102h.

Then, the request for subline 1 is set for the same entry of the L2-LB 102*h*, and the request sc_req for subline 1 is sent to the SC 200 (step S128). The PFPORT 102*b* is notified that the PF pipeline process for subline 1 has been completed, and the valid flag (sub_valid[01]) for subline 1 of the PFPORT 102*b* is turned off.

Then, a request to execute the PF pipeline process for subline 2 is issued from the PFPORT 102*b*, and the PF pipeline process for subline 2 is executed (step S129). In similar fashion, the PF pipeline process for subline 2 is aborted, and based on the command from the L2-LB 102*h*, the PFPORT 102*b* turns on the waiting flag (wt_flg) for the particular entry.

Once the sn_res_64 response corresponding to subline 2 reaches the L2-LB 102*h* from the SC 200 (step S133), the valid flag (sub_valid[2]) for subline 2 of the PFPORT 102*b* is turned off, and the PF pipeline process corresponding to subline 2 executed (step S134). Since the sn_res_64 response corresponding to subline 1 has already arrived, the request for subline 2 is set for the same entry of the L2-LB 102*h*, and the signal sc_req for subline 2 is sent out to the SC 200 (step S135). The PFPORT 102*b* is notified that the PF pipeline process for subline 2 is completed, and the valid flag (sub_valid[2]) for subline 2 of the PFPORT 102*b* is turned off.

Then, the PF pipeline process request for subline 3 is issued from the PFPORT 102*b*, and the PF pipeline process for subline 3 is executed (step S136). In similar fashion, the PF pipeline process for subline 3 is aborted, and based on the command from the L2-LB 102*h*, the PFPORT 102*b* turns on the waiting flag (wt_flg) for the particular entry.

Upon arrival of the sn_res_64 response corresponding to subline 3 at the L2-LB 102*h* from the SC 200 (step S140), the valid flag (sub_valid[3]) for subline 3 of the PFPORT 102*b* is turned off, and the PF pipeline process corresponding to subline 3 is executed (step S141). Since the sn_res_64 response corresponding to subline 1 has already arrived, the request for subline 3 is set for the same entry of the L2-LB 102*h*, and the signal sc_req for subline 2 is sent out to the SC 200 (step S142). The PFPORT 102*b* is notified that the PF pipeline process for subline 3 is completed, and the valid flag (sub_valid[3]) for subline 3 of the PFPORT 102*b* is turned off. As a result, the particular entry of the PFPORT 102*b* is released.

At about the time of each sn_res_64 response to the signal sc_req corresponding to sublines 0 to 3, the SC 200 give a data request for the particular address to the MAC 300, and once the data becomes ready, gives a "dow" notice to the CPU 100 together with the 64-byte data (steps S130, S137, S143, 3S147). Upon reception of the header of each "dow", the tag entry pipeline (tag_entry_pipeline) process is requested from the L2-LB 102*h* to the L2 pipeline processing unit 102*f*, and once the priority is secure, the tag entry pipeline process is executed (steps S131, S138, S144, S148). In the tag entry pipeline process, the tags for the four sublines of the WAY secured in the replace pipeline process are written at a time collectively in the L2 tag storage unit 102*g*.

The L2-LB 102*h*, upon reception of the data portion of each "dow" from the SC 200, requests the L2 pipeline processing unit 102*f* to execute, in the order of completion of data reception for sublines 0 to 3, the data write pipeline process for the WAY secured in the replace pipeline process, so that the data write pipeline process is executed (steps S132, S139, S145, S149). Upon total completion of the data write pipeline process, the entry of the L2-LB 102*h* is released.

Figure 3:
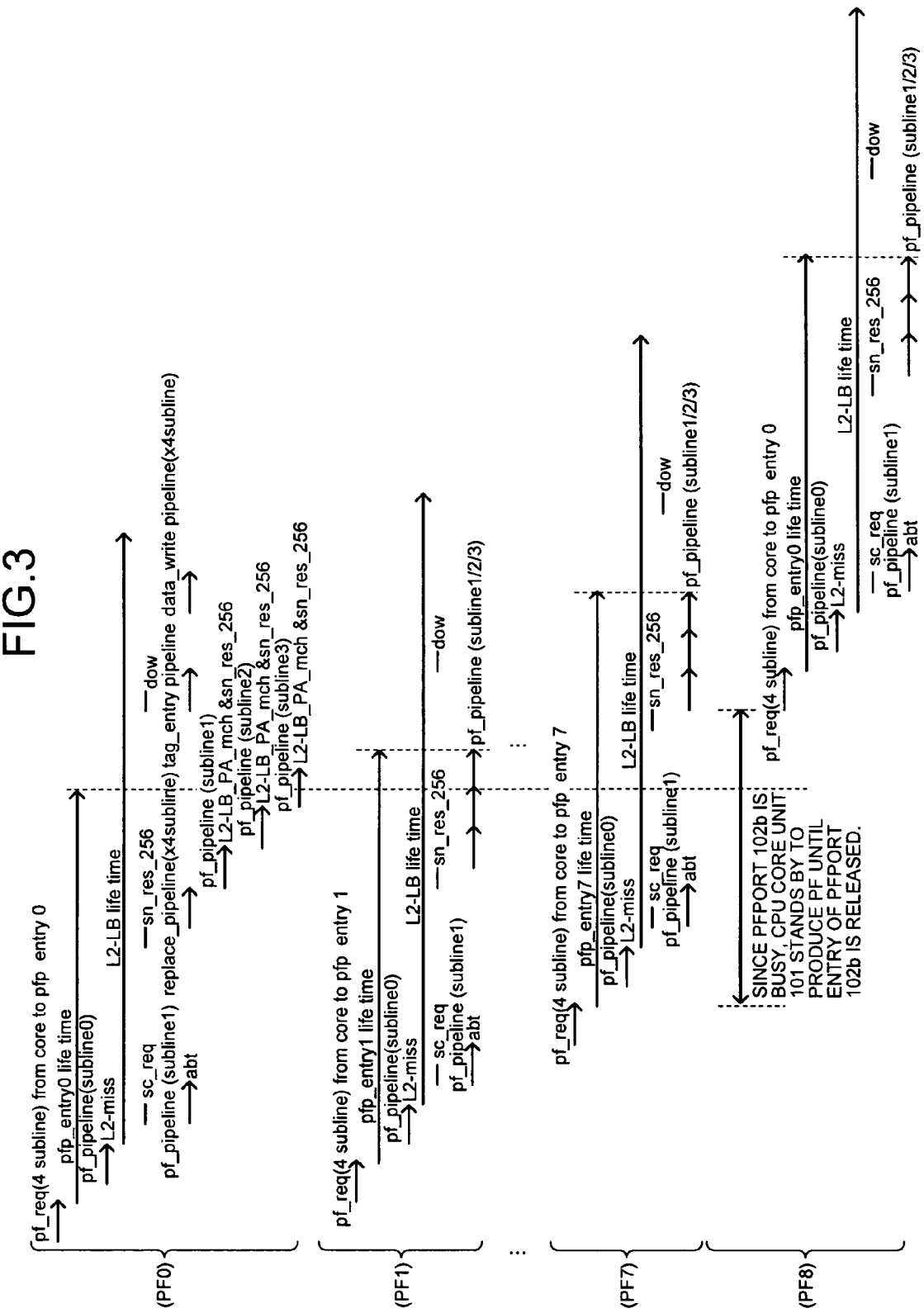
FIG. 3 is a timing chart illustrating the operation of the conventional multicore processor.

Next, the operation of the conventional multicore processor is explained. FIG. 3 is a timing chart illustrating the operation of the conventional multicore processor. Assume that FIG. 3 depicts a case involving the sn_res_256 response alone. Specifically, the PF 0 to PF 8 depicted in FIG. 3 are identical with the process depicted in FIG. 2A. Nevertheless, sn_res_256 is not the only choice, but sn_res_256 or sn_res_64 may alternatively be selected. The number of PF entries of the PFPORT 102*b* is assumed to be eight.

Assume that nine PFs of the cache line including all the four sublines are issued from the CPU core unit 101 to the PFPORT 102*b* of the common L2 cache unit 102 (PFs 0 to 8). In the PFPORT 102*b*, all the entries (PFPORT 0 to PFPORT 7) are occupied (enter the busy state) in all the first eight PFs 0 to 7, while the ninth PF 8 is required to stand by until any one of the entries is released.

Assume that the PFPORT 0 is first released. After the PF pipeline process is completed for all the PF sublines 0 to 3 of the PFPORT 0 in the L2 pipeline processing unit 102*f* thereby to release the PFPORT 0, the ninth PF 8 is issued from the CPU core unit 101. This PF is set in the PFPORT 0 so that the PF pipeline process is executed and the sc_req signal is issued.

As described above, in the conventional multicore processor, as long as all the entries of the PFPORT 102*b* are busy and the PF registered in any one of the entries is not released by "abt" or "cmp" of the PF pipeline process, a new PF cannot be registered in the PFPORT 102*b*, and this waiting state generates a time loss. Especially, in the multicore processor with a plurality of CPU cores sharing one L2 cache, such a loss occurs in high probability, thereby posing the problem that the advantage of the prefetch aimed at an improved CPU processing rate by advance data reading is adversely affected.

Figure 4:
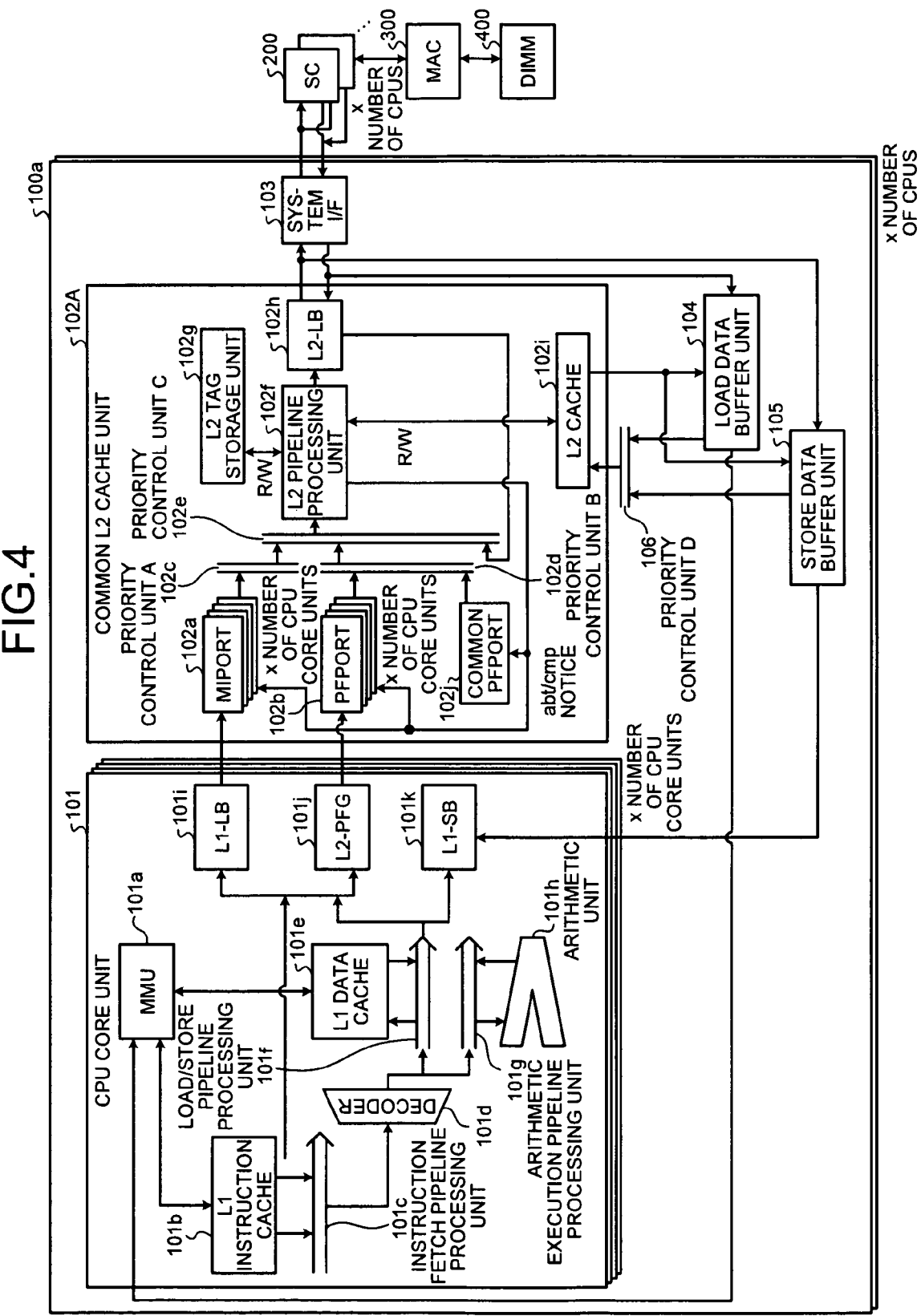
FIG. 4 is a block diagram illustrating the configuration of the multicore processor according to an embodiment.

Next, the configuration of the multicore processor according to an embodiment of the invention is explained. FIG. 4 is a block diagram illustrating the configuration of the multicore processor according to an embodiment. With reference to FIG. 4, only the difference from the conventional multicore processor illustrated in FIG. 1 is explained.

A common L2 cache unit 102A of the CPU 100*a* providing the multicore processor according to an embodiment, in addition to the PFPORT 102*b* arranged for each CPU core unit 101, has a common PFPORT 102*j* shared by the plurality of the CPU core units 101.

The common PFPORT 102*j* has substantially the same configuration as the PFPORT 102*b*, the difference being that the input interface is provided by the CPU core unit 101 in the PFPORT 102*b*, while the input interface is provided by the stage following the L2 pipeline processing unit 102*f* in the common PFPORT 102*j*.

The PFPORT 102*b* secures a new entry with the PF from the CPU core unit 101, while the common PFPORT 102*j* secures an entry at the time of abortion of the PF loaded from the PFPORT 102*b* to the L2 pipeline processing unit 102*f*.

Also, with regard to the operation of erasing the duplicate entry by address matching with the DM, the PFPORT 102*b* is such that the entry of the PFPORT 102*b* is erased when the address is matched with the DM from the CPU core unit 101, while the common PFPORT 102*j* is such that the entry thereof is erased in the case of address matching with the DM processed in the L2 pipeline processing unit 102*f* and having the entry thereof registered in the L2-LB 102*h*.

Figure 5:
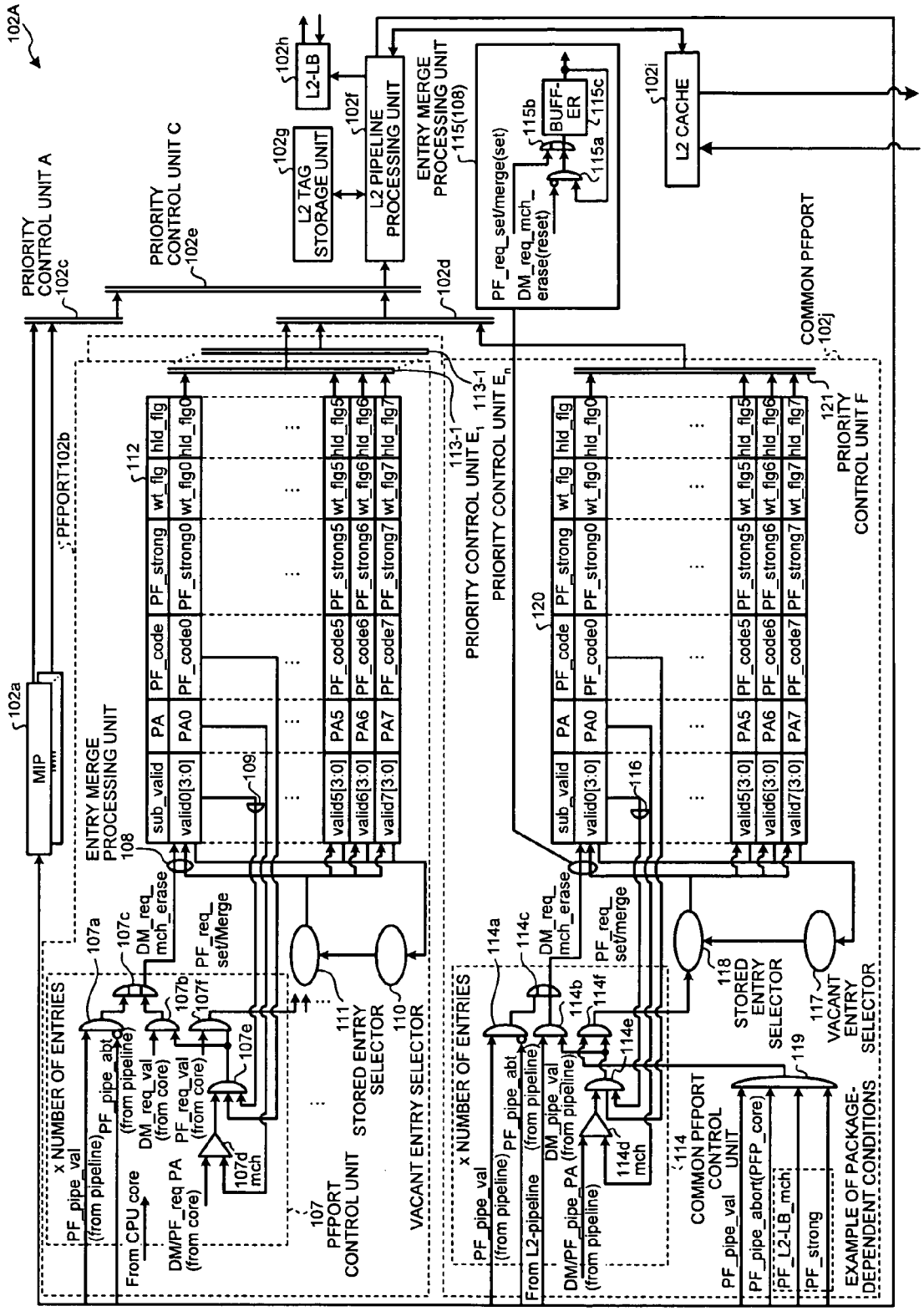
FIG. 5 is a block diagram illustrating the detailed configuration of the common L2 cache unit of the multicore processor according to an embodiment.

Next, the detailed configuration of the common L2 cache unit of the multicore processor according to an embodiment is explained. FIG. 5 is a block diagram illustrating the detailed configuration of the common L2 cache unit of the multicore processor according to an embodiment. The explanation made below with reference to FIG. 5 is concentrated especially on the configuration of the common PFPORT 102*j* and the PFPORT 102*b* of the common L2 cache unit 102A of the multicore processor according to an embodiment.

The PFPORT 102b includes a PFPORT control unit 107, an entry marge processing unit 108, an OR gate 109 for extracting an entry in which at least one of the sub_valid[3] signals indicating the validity of each subline in the cache line is in on state (an entry with at least one valid subline), a vacant entry selector 110, a stored entry selector 111, an entry table 112 and a priority control unit $E_1$ 113-1. The PFPORT control unit 107 is arranged for each entry of the entry table 112. Also, the maximum number of entries in the entry table 112 is eight, for example.

The PFPORT 102b is arranged for each CPU core unit 101. For example, n (n: natural number) PFPORTs 102b correspond to n CPU core units 101, respectively, and each PFPORT 102b includes the corresponding one of a priority control unit $E_1$ 113-1, ..., a priority control unit $E_n$ 113-1. The priority control unit B 102d is supplied with the outputs from the priority control units $E_1$ 113-1, ..., $E_n$ 113-1 and the priority control unit F 120 of the common PFPORT 102j described later, and outputs one PF to the priority control unit C 102e by priority control.

The entry table 112 is stored in a predetermined storage area, and has columns "sub_valid", "PA", "PF_code", "PF_strong", "wt_flg" and "hld_flg". "PA" designates a physical address at which the data on the PF cache line is stored.

"PF_code" indicates the PF request type and that the object of PF is "an instruction fetch data", "a load (read) data" or "a store (storage) address (a physical address to store the data)". "PF_code" includes "the instruction fetch data", "the load data" and "the store data" in the ascending order of priority.

Also, when the address of the object data coincides between the preceding request and the succeeding request existing in the PFPORT 102b or the common PFPORT 102j, the sub_valid signal corresponding to the subline of the address corresponding to PA[7:6] of the PF is turned off to erase the request for the particular subline. As a result, when the last sub_valid is turned off, the entry of the PFPORT 102b or the common PFPORT 102j is released.

Assume that the preceding request is the PF with the object data as "the load data" while the succeeding request is the DM with the object data as "the instruction fetch data", that the preceding request is the PF with the object data as "the store data" while the succeeding request is the DM with the object data as "the instruction fetch data" or that the preceding request is the PF with the object data as "the store data" while the succeeding request is the DM with the object data as "the load instruction". In each of these cases, the request for the particular subline is not erased even if the addresses corresponding to PA[7:6] of the PF thereof coincide with each other.

"PF_strong" is a flag indicating the attribute of the PF, which is processed without fail as long as "PF_strong" is on (strong) but not necessarily required to be processed but allowed to be discarded (prefetch lost) when "PF_strong" is off (weak).

The signal "wt_flg" indicates a flag turned on when aborted without any response sn_res when the PF of the particular entry is first subjected to the PF pipeline process. Until "wt_flg" is reset subsequently, the loading of the PF of the particular entry into the L2 pipeline processing unit 102f is suppressed. The reset notice is given from the L2-LB 102h with the reception of sn_res_64 or sn_res_256 as a motive. As long as "wt_flg" is on, the PF is prevented from being subjected to the PF pipeline process wastefully before the response sn_res.

The flag "hld_flg" is kept on while the PF corresponding to a given subline is being subjected to the pipeline process. As long as "hld_flg" remains on, the other sublines of the same PF are not subjected to the PF pipeline process. This is by reason of the fact that when the other sublines of the same PF are subjected to the PF pipeline process continuously, the displacement of the process (the reversal of the order in which the PF pipeline process is executed) occurs, and the PF pipeline process for the succeeding sublines is required to be aborted.

The PFPORT control unit 107, which takes charge of the overall control of the PFPORT 102b, specifically includes an AND gate 107a for producing the logic product of "PF_pipe_val" indicating the validity of the PF pipeline from the L2 pipeline processing unit 102f and the opposite logic "PF_pipe_abt" indicating that the PF pipeline from the L2 pipeline processing unit 102f is aborted, an AND gate 107b for producing the logic product of "DM_req_val" indicating the DM from the CPU core unit 101 and the output of an AND gate 107e described later, an OR gate 107c for producing the logic sum of the output of the AND gate 107a and the output of the AND gate 107b, a matching circuit 107d for determining the coincidence between the physical address (DM/PF_req_PA) of the object data of DM or PF from the CPU core unit 101 and the physical address "PA" stored in the entry table 112, the AND gate 107e for producing the logic product of the output of the matching circuit 107d, "sub_valid" indicating the validity of the subline stored in the entry table 112 and "PF_code" indicating the type of the PF, and an AND gate 107f for producing the logic product of "PF_pipe_val" indicating the validity of the pipeline of the PF from the CPU core unit 101 and the output of the AND gate 107e.

The matching circuit 107d, upon reception of the PF request (PF_req_val) from the CPU core unit 101, conducts the address matching in units of the 256-byte cache line with at least one of the valid entries (sub_valid[3:0]) which is in on state. When no entry has a coincident address, the PF is registered by the stored entry selector 111 in the vacant entry selected by the vacant entry selector 110, while a coincident address, if any, is merged with the coincident entries by the entry merge processing unit 108 (specifically, such an entry is set (registered) or merged (integrated) by inputting the request "PF_req_set/merge" from the stored entry selector 111).

When the PF is registered in a new entry, the "sub_valid" for the subline of the physical address of the PF corresponding to PA[7:6] is turned on. PA[7:6]=00, 01, 10, 11 correspond to sublines 0, 1, 2, 3, respectively.

With regard to "PA", "PF_code" and "PF_strong", the notice for PF from the CPU core unit 101 is complied with. The initial values of "wt_flg" and "hld_flg" are turned off. In merge operation, "sub_valid" for the subline of the address of the PF corresponding to PA[7:6] is turned on.

Consider "PF_code" and "PF_strong" without any PA change. When the preceding PF and the succeeding PF have the same "PF_strong", the preceding PF or the succeeding PF, whichever is associated with "PF_code" higher in priority order, is employed. When "PF_strong" is different, on the other hand, "PF_code" with "PF_strong" in on state is employed.

Also, when the addresses of the preceding and succeeding PFs existing in the PFPORT 102b coincide with each other, the entry merge processing unit 108 turns off "sub_valid" for the subline of the address of the PF corresponding to PA[7:6], and the entry corresponding to the particular subline is erased from the entry table 112 (Specifically, it is erased by receiving a signal "DM_req_mch_erase" indicating the erasure of the DM request having a coincident address from the OR gate 107c). As a result, the PF entry with the last "sub_valid" turned off is released from the entry table 112.

At the end of the PF pipeline process, a notice as to whether the PF pipeline process is completed (cmp) or aborted (suspended) is given from the L2 pipeline processing unit 102f to the PFPORT 102b. If complete (cmp), the "sub_valid" for the particular subline is turned off, while if aborted, the "sub_valid" is left in on state.

The common PFPORT 102j has substantially the same configuration as the PFPORT 102b. What is different lies in that the PFPORT 102b accepts the input from the CPU core unit 101, whereas all the inputs to the common PFPORT 102j are received from the L2 pipeline processing unit 102f.

Also, the PFPORT 102b secures a new entry by the PF from the CPU core unit 101, whereas the common PFPORT 102j secures a new entry by an aborted one of the PFs loaded into the L2 pipeline processing unit 102f from the PFPORT 102b.

Also, with regard to the entry erase operation due to address matching with the DM, the PFPORT 102b determines the address matching with the DM from the CPU core unit 101, whereas the common PFPORT 102j determines the address matching with the DM registered in the L2-LB 102h.

The common PFPORT 102j includes a common PFPORT control unit 114, an entry merge processing unit 115, an OR gate 116 for extracting an entry with at least one of the signals sub_valid[3:0] in on state, a vacant entry selector 117, a stored entry selector 118, an AND gate 119, an entry table 120 and a priority control unit F121.

The common PFPORT control unit 114, which is a controller to control the common PFPORT 102j as a whole, is arranged for each entry of the entry table 120. The common PFPORT control unit 114 includes an AND gate 114a, an AND gate 114b, an OR gate 114c, a matching circuit 114d, an AND gate 114e and an AND gate 114f. The AND gate 114a, the AND gate 114b, the OR gate 114c, the matching circuit 114d, the AND gate 114e and the AND gate 114f have substantially the same function as the AND gate 107a, the AND gate 107b, the OR gate 107c, the matching circuit 107d, the AND gate 107e and the AND gate 107f, respectively.

Also, the maximum number of the entries in the entry tables 120 is, for example, eight. The common PFPORT 102j is only one in number regardless of the number of the CPU core units 101.

The common PFPORT control unit 114, the entry merge processing unit 115, the OR gate 116, the vacant entry selector 117, the stored entry selector 118 and the entry table 120 of the common PFPORT 102j have substantially the same configuration and function as the PFPORT control unit 107, the entry merge processing unit 108, the OR gate 109, the vacant entry selector 110, the stored entry selector 111 and the entry table 112, respectively, of the PFPORT 102b.

The difference lies in that the common PFPORT 102j has the AND gate 119 for producing the logic product of "PF_pipe_val" indicating the validity of the pipeline for the PF from the L2 pipeline processing unit 102f, "PF_pipe_abt" indicating the PF aborted in the L2 pipeline processing unit 102f, "PF_L2-LB_mch" indicating the address matching with the DM registered in the L2-LB 102h and "PF_strong" indicating the attribute of the PF from the L2 pipeline processing unit 102f, and that the output of the AND gate 119 is input to the AND gate 114f.

A priority control unit F 121 operates in such a manner that the valid entries with "wt_flg" and "hid_flg" turned off are loaded into the L2 pipeline processing unit 102f in chronological order. The priority control unit B 102d, on the other hand, optimally selects the PF from the PFPORT 102b according to the LRU algorithm. The PF from the common PFPORT 102j is often older than the PF from the PFPORT 102b, and therefore, selected and loaded in priority into the L2 pipeline processing unit 102f.

The entry merge processing units 108 and 115 have a detailed configuration including, as illustrated, an AND gate 115a for producing the logic product of the inverted input of "DM_req_mch_erase" indicating the erasure of the DM request having a coincident address from the OR gate 107c or 114c and the input from a buffer 115c for holding the value of "sub_valid[3:0]" described later, an OR gate 115b for producing the logic sum of "PF_req_set/merge" indicating the setting or merging of the FP request from the stored entry selector 111 or 118 and the output of the AND gate 115a, and the buffer 115c for holding the output of the OR gate 115b.

As the result of the process executed by the entry merge processing units 108 and 115, the entries of the PF having an address matched with the DM from the CPU core unit 101 are erased from the entry tables 112 and 120. Also, when an entry having a coincident address already exists in the entry tables 112 and 120, the entry of the PF from the CPU core unit 101 or the L2 pipeline processing unit 102f can be merged with the existing entries, thereby making it possible to utilize the resources of the entry tables 112 and 120 efficiently.

Figure 6:
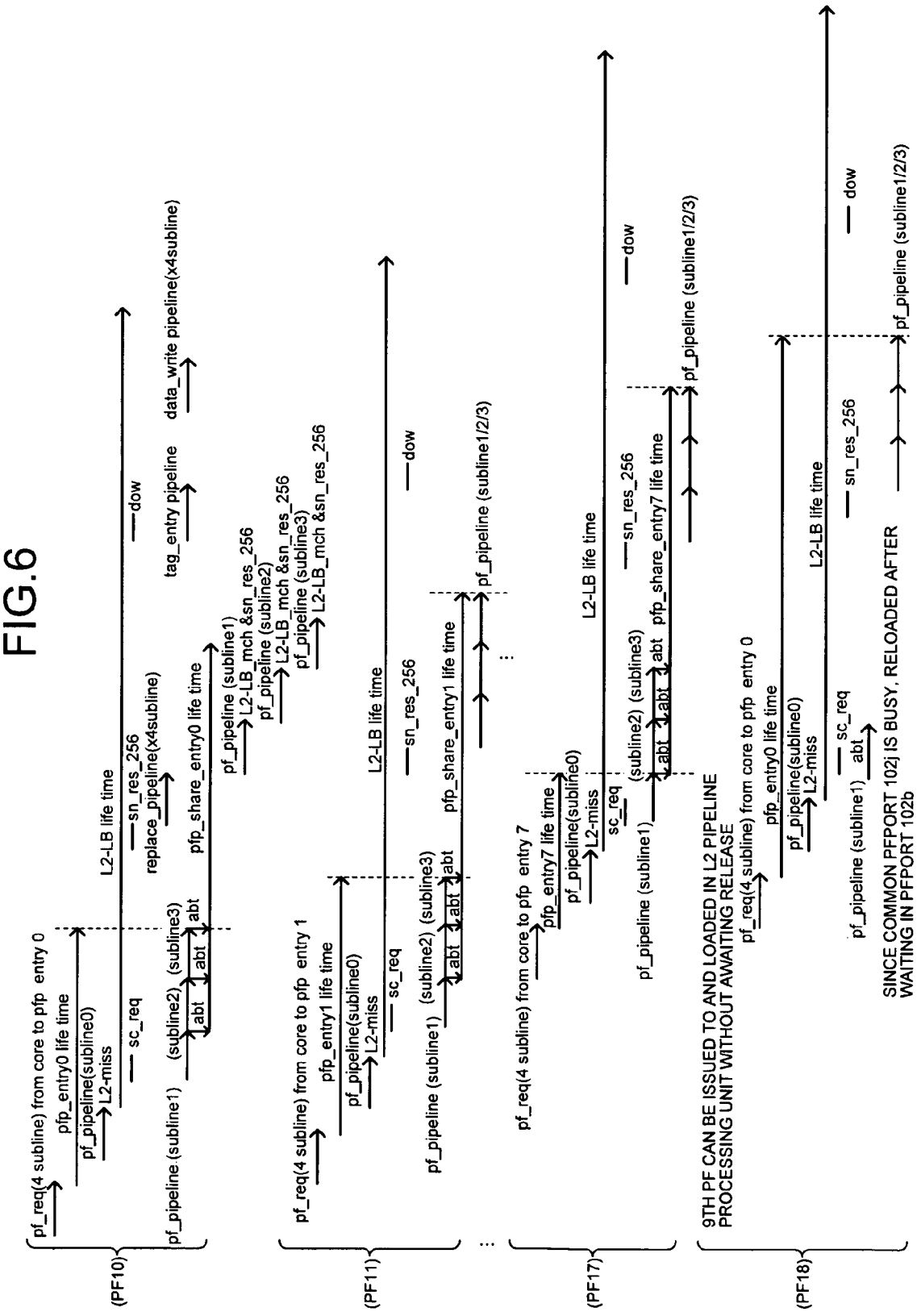
FIG. 6 is a timing chart illustrating the operation of the multicore processor according to an embodiment.

Next, the operation of the multicore processor according to an embodiment is explained. FIG. 6 is a timing chart illustrating the operation of the multicore processor according to an embodiment. FIG. 6 represents a case in which all the responses are "sn_res_256". Specifically, the PFs 10 to 18 depicted in FIG. 6 are processed in the same manner as in FIG. 2A. Nevertheless, the response is not limited to sn_res_256 but may alternatively be sn_res_256 or sn_res_64 with equal effect. The number of entries of the common PFPORT 102j is assumed to be eight.

Assume that eight cache line PFs each containing all the four sublines are issued from the CPU core unit 101 to the PFPORT 102b of the common L2 cache unit 102 (PFs 10 to 18). In the PFPORT 102b, all the entries (PFPORTs 0 to 7) are occupied (become busy) with the eight PFs 10 to 17. Since all the entries of the PFPORT 102b are occupied (busy), however, the ninth PF 18 from the CPU core unit 101 or the L2 pipeline processing unit 102f waits in the common PFPORT 102j before being loaded into the L2 pipeline processing unit 102f.

As described above, the multicore processor according to an embodiment operates in such a manner that even when all the entries of the PFPORT 102b are busy and the PF registered in any one of the entries is not released by "abt" or "cmp", a new PF can be registered in the common PFPORT 102j, and therefore, the occurrence of a loss time for waiting can be avoided. Especially, the PFs, even if issued concentratedly from a single CPU core unit 101, can be smoothly processed.

As illustrated specifically in this example, the subline system is of two types depending on whether the CPU 100 transfers the data in units of sublines (sn_res_64) or transfers all the sublines (sn_res_256) in response to the data request to the system, and one of the data transfer methods is determined in accordance with the result of the snoop operation (synchronous operation of the cache memory) on the system side. In such a system, the common PFPORT 102j is more suitably employed.

This is by reason of the fact that in the non-subline system, once the entry of the L2-LB 102h is secured in the first PF pipeline process, the PF pipeline process for the cache line would be completed and the entry of the PFPORT could be released.

Figure 7:
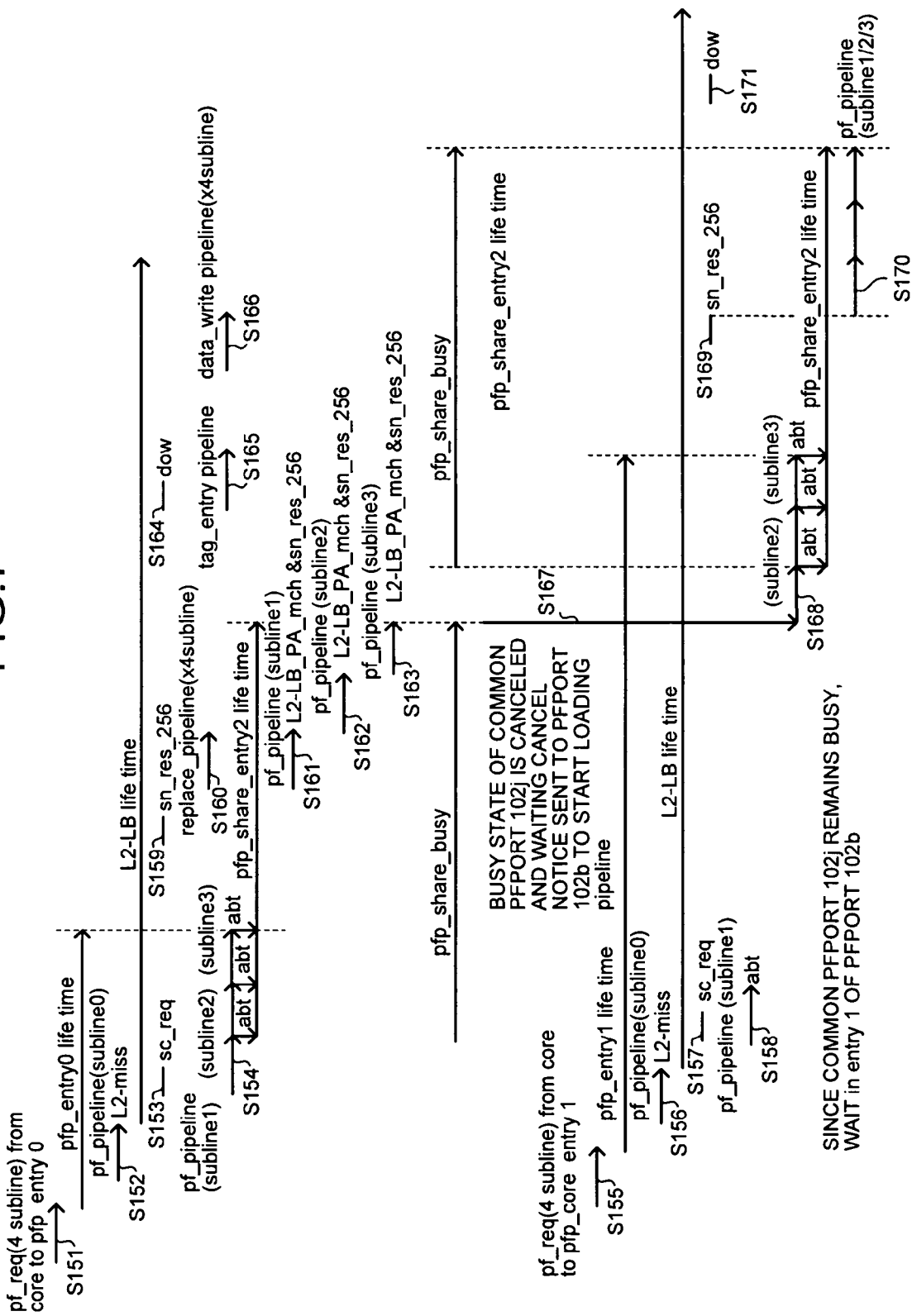
FIG. 7 is a timing chart illustrating the operation of the common L2 cache unit (the prefetch request moved to the common PFPORT by canceling the waiting flag) according to an embodiment.

Next, the operation of the common L2 cache unit according to an embodiment (the prefetch request is moved to the common PFPORT by canceling the waiting flag) is explained. FIG. 7 is a timing chart illustrating the operation of the common L2 cache unit according to an embodiment (the prefetch request is moved to the common PFPORT by canceling the waiting flag).

First, the CPU core unit 101 outputs a PF including four sublines to the corresponding PFPORT 102*b* of the corresponding common L2 cache unit 102 (pf_req(4subline) from Core to pfp entry0, step S151).

The PFPORT 102*b* that has received the PF registers it in entry 0 (pf_entry0) of the entry table 112 and turns on all the valid flags (sub_valid[0] to sub_valid[3]) corresponding to sublines 0 to 3. The expression "pfp_entry0 life time" indicates the period in which entry 0 of the PFPORT 102*b* is occupied and released by the particular PF. During this period, at least one of the valid flags for sublines 0 to 3 is in on state.

Then, the PFPORT 102*b* that has received the PF issues a priority request to the pipeline processing unit 102*f* for subline 0. Once the priority is secured in the pipeline processing unit 102*f*, the PF pipeline process designated by "pf_pipeline (subline0)" is executed (step S152).

When both the 256-byte cache line and the 64-byte subline are found to be the L2 cache miss for the tag attached to the PF as the result of searching the L2 tag storage unit 102*g* during the PF pipeline process, then the entry of the L2-LB 102*h* is secured after the PF pipeline process. Since the PF pipeline process for subline 0 is complete, the valid flag of subline 0 (sub_valid[0]) of the PFPORT 102*b* is turned off.

Further, the data request sc_req for the system is issued from the L2-LB 102*h* to the SC 200 (step S153). Since the PF pipeline process for subline 0 is completed, the PFPORT 102*b* next issues a priority request to the pipeline processing unit 102*f* for sublines 1, 2 and 3. Once the priority is secured, the PF pipeline process for sublines 1, 2 and 3 is executed (step S154).

Since the response sn_res_256 has yet to return from the SC 200, however, the PF pipeline process for sublines 1, 2 and 3 cannot be completed. From the L2 pipeline processing unit 102*f*, therefore, a completion notice is given to the PFPORT 102*b* and a PF request set notice to the common PFPORT 102*j*, so that the particular PF is moved to the common PFPORT 102*j*.

This PF is registered in entry 2 (pfp_entry2) of the entry table 120, and all the valid flags (sub_valid[0] to sub_valid [3]) corresponding to sublines 0 to 3 and the waiting flag (wt_flg) are turned on. Assume that since the PF is registered in the last vacant entry (pfp_share_entry2) of the common PFPORT 102*j*, the common PFPORT 102*j* enters the busy mode.

"pfp_share_entry0 life time" indicates the period during which the PF pipeline process for subline 1 is aborted and entry 0 of the common PFPORT 102*j* is occupied by the particular PF and released.

Further, the CPU core unit 101 outputs a new PF containing four sublines to the corresponding PFPORT 102*b* of the common L2 cache unit 102 (pf_req(4subline) from Core to pfp entry1, step S155).

The PFPORT 102*b* that has received this PF registers it in entry 1 (pf_entry1) of the entry table 112, and turns on all the valid flags (sub_valid[0] to sub_valid[3]) corresponding to sublines 0 to 3. The signal "pfp_entry1 life time" indicates the period during which entry 1 of the PFPORT 102*b* is occupied by the particular PF and released. During this period, at least one of the valid flags of sublines 0 to 3 is in on state.

Then, the PFPORT 102*b* that has received the new PF issues a priority request to the pipeline processing unit 102*f* for subline 0. Once the priority is secured in the pipeline processing unit 102*f*, the PF pipeline process indicated by "pf_pipeline(subline0)" is executed (step S156).

When both the 256-byte cache line and the 64-byte subline are found to be the L2 cache miss for the tag attached to the PF as the result of searching the L2 tag storage unit 102*g* during the PF pipeline process, then the entry of the L2-LB 102*h* is secured after the PF pipeline process. Since the PF pipeline process for subline 0 is complete, the valid flag of subline 0 (sub_valid[0]) of the PFPORT 102*b* is turned off.

Further, the data request sc_req for the system is issued from the L2-LB 102*h* to the SC 200 (step S157). Since the PF pipeline process for subline 0 is completed, the PFPORT 102*b* next issues a priority request to the pipeline processing unit 102*f* for sublines 1, 2 and 3. Once the priority is secured, the PF pipeline process for sublines 1, 2 and 3 is executed (pf_pipeline (subline 1), step S158).

Since the response sn_res_256 has yet to return from the SC 200, however, the PF pipeline process for sublines 1, 2 and 3 is aborted. In addition, the common PFPORT 102*j* is busy, and therefore, the new PF waits by staying in entry 1.

Upon arrival of the response sn_res_256 corresponding to the PF for the 256-byte cache line registered in entry 2 (pfp_share_entry 2) of the entry table 120 (step S159), the replace pipeline process for four sublines (replace_pipeline(×4 subline)) is executed (step S160).

Then, "wt_flg" of the entry "0pfp_share_entry2" of the entry table 120 is canceled by the common PFPORT control unit 114, and the PF pipeline process is started sequentially for sublines 1, 2 and 3 (steps S161, S162, S163). These PF pipeline processes are all completed since the 256-byte address matching in the L2-LB 102*h* and the response sn_res_256 from the SC 200 are already ended.

The SC 200, at about the time of sn_res_256 response, issues an address data request to the MAC 300, and once the data is prepared, sends the 256-byte data with the "dow" notice to the CPU 100 (step S164). Upon reception of the "dow" header, the tag entry pipeline process (tag_entry_pipeline) is requested to the L2 pipeline processing unit 102 from the L2-LB 102*h*, and once the priority is secured, the tag entry pipeline process is executed (step S165).

The L2-LB 102*h*, upon reception of the data portion of "dow" from the SC 200, requests the L2 pipeline processing unit 102*f* to execute the data_write_pipeline process for the WAY secured by the replace pipeline process, in the order of completion of reception of data for sublines 0 to 3, thereby executing the data write pipeline process (step S166).

At the end of step S163, the entry 0pfp_share_entry2 of the entry table 120 is released. Then, the common PFPORT 102*j* notifies the PFPORT 102*b* that the busy state of the common PFPORT 102*j* is ended ("wt_flg" canceled) (step S167).

The PFPORT 102*b* that has received the "wt_flg" cancellation notice starts the PFs for sublines 1, 2 and 3 sequentially (step S168). Since the corresponding sn_res_256 response has not yet arrived, however, the PF pipeline process is aborted thereby to move the PFs corresponding to sublines 1, 2, 3 to the entry 0pfp_share_entry2 of the entry table 120. With the returning of sn_res_256 response from the SC 200 (step S169), the PF pipeline process for sublines 1, 2 and 3 is completed (cmp) (step S170).

The SC 200, at about the time of the sn_res_256 response, requests the address data from the MAC 300, and when the data is ready, sends a "dow" notice to the CPU 100 together with the 256-byte data (step S171).

With the release of the entry 0pfp_share_entry2 of the entry table 120 as a motive, the PF of entry 1 waiting in the PFPORT 102*b* is moved to the thus far vacant pfp_share_entry2 by the PFPORT control unit 107. In this way, the vacant entries of the PFPORT 102b can be increased, and therefore, the room for accepting a greater number of PFs from the CPU core unit 101 becomes available.

Figure 8:
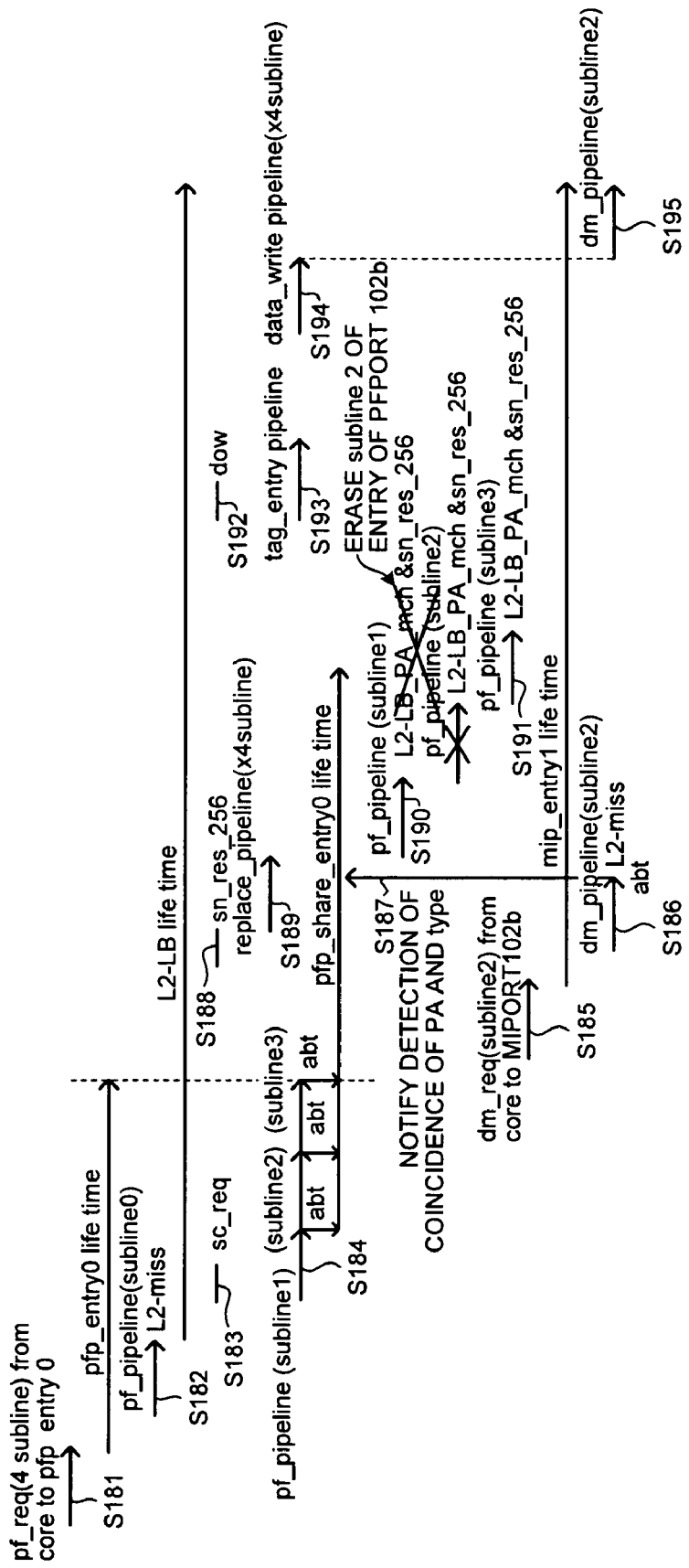
FIG. 8 is a timing chart illustrating the operation of the common L2 cache unit (the entry erased for each subline of the cache line from the common PFPORT) according to an embodiment.

Next, the operation of the common L2 cache unit (to erase the entry for each subline of the cache line from the common PFPORT) according to an embodiment is explained. FIG. 8 is a timing chart illustrating the operation (to erase the entry for each subline of the cache line from the common PFPORT) of the common L2 cache unit according to an embodiment.

First, the CPU core unit 101 outputs the PF containing four sublines to the corresponding PFPORT 102b of the L2 cache unit 102 (pf_req(4subline) from Core to pfp entry0, step S181).

The PFPORT 102b that has received the PF registers it in entry 0 (pf_entry0) of the entry table 112, and turns on all the valid flags (sub_valid[0] to sub_valid[3]) corresponding to sublines 0 to 3. The expression "pfp_entry0 life time" indicates the period during which the entry 0 of the PFPORT 102b is occupied by the particular PF and released. During this period, the valid flag of at least one of sublines 0 to 3 is in on state.

Then, the PFPORT 102b that has received the PF issues a priority request to the pipeline processing unit 102f to load the pipeline for subline 0. Once the priority is secured in the pipeline processing unit 102f, the PF pipeline process indicated by pf_pipeline(subline0) is executed (step S182).

When the result of searching the L2 tag storage unit 102g during the PF pipeline process indicates that both the 256-byte cache line and the 64-byte subline are the L2 cache miss for the tag attached to the PF, then the entry of the L2-LB 102h is secured after the PF pipe line process. Since the PF pipeline process for subline 0 is completed, the valid flag for subline 0 (sub_valid[0]) of the PFPORT 102b is turned off.

Further, the data request sc_req for the system is issued to the SC 200 from the L2-LB 102h (step S183). Since the PF pipeline process for subline 0 is complete, the PFPORT 102b next issues a priority request to the pipeline processing unit 102 for sublines 1, 2 and 3. Once the priority is secured, the PF pipeline process for sublines 1, 2 and 3 is executed (step S184).

In view of the fact that the sn_res_256 response has yet to return from the SC 200, however, the PF pipeline process for sublines 1, 2 and 3 cannot be completed. From the L2 pipeline processing unit 102f, therefore, the completion notice is given to the PFPORT 102b and the PF request set notice to the common PFPORT 102j thereby to move the particular PF to the common PFPORT 102j. Then, the same PF is registered in entry 0 (pfp_share_entry0) of the entry table 120, and all the valid flags (sub_valid[0] to sub_valid[3]) corresponding to the sublines 0 to 3 and the waiting flag (wt_flg) are turned on.

Now, the DM of subline 2 corresponding to the same 256-byte cache line as the one for the PF registered in "pfp_share_entry0" is issued to and registered in the MIPORT 102a (dm_req(subline2) from core to mip, step S185). Then, the pipeline process (dm_pipeline process) of the request dm_req (subline2) is started from the MIPORT 102a (step S186).

During the dm_pipeline process in response to the DM request, the L2 cache miss occurs, and the data_write_pipeline process is not completed. Therefore, the dm_pipeline process cannot be completed, so that "wt_flg" is turned on into the waiting mode. At the same time, the L2-LB 102h detects the matching of the 256-byte address of subline 2 and "PF_code", and "sub_valid[1]" corresponding to subline 2 of "pfp_entry0" is turned off. As a result, the pf_pipeline process corresponding to subline 2 is not started from pfp_entry0.

Upon reception of the sn_res_256 response from the SC 200 (step S188), the 4-subline replace pipeline process for sublines (replace_pipeline ('4subline)) is executed (step S189).

Then, the pf_pipeline process corresponding to sublines 0, 1, 3 is started from "pfp_entry0" (steps S190, S191). Since the sn_res_256 response has already arrived in step S188, the pf_pipeline process corresponding to sublines 1 and 3 is completed, and "pfp_entry0" is released. As to subline 2, the pf_pipeline process is not executed since "sub_valid[1]" is turned off.

At the same time as the "dow" response from the SC 200, the tag_entry_pipeline process for the tag entry held in the L2 tag storage unit 102g and the data_write_pipeline process for the secondary cache data held in the L2 cache 102i are started (steps S192, S193). Once the data_write_pipeline process corresponding to subline 2 is executed (step S194), "wt_flg" of "pfp_entry0" is turned off, and the dm_pipeline process is executed for the DM request of subline 2 of the DM thus far waiting (step S195).

As described above, when the DM matches with the object data in address, "sub_valid" of the subline for the PF is turned off. The waste which otherwise might occur can thus avoided in which the PF pipeline process for the particular subline not executed based on the PF but in duplication with the DM.

Now, an explanation is given about the difference between the tag matching by the non-subline method and the tag matching by the subline method with the common L2 cache unit. FIG. 9A is a block diagram illustrating a tag matching circuit according to the non-subline method with the common L2 cache unit. FIG. 9B is a block diagram illustrating a tag matching circuit according to the subline method with the common L2 cache unit. FIG. 9B is based on the 4-subline method in which the cache line includes four sublines 0 to 3.

First, refer to FIG. 9A. In the non-subline method, the TAG_entry providing the entry of the tag information held in the tag storage unit 102g is managed by the index "PA_index ([18:8])", and includes the columns of "PA_TAG[46:19]" (address tag area), "valid" (valid flag), "L2_TC[2:0]" (the flag indicating whether the data is held in the L2 cache 102i), "L1_TC[2:0]" (the flag indicating whether the L1 caches (the L1 instruction cache 101b and the L1 data cache 101e) hold the data) and "CORE_ID[1:0]" (the identification information for the CPU core unit 101 holding the data in the L1 cache). According to combination of "L1_TC" and "CORE_ID", a plurality of the CPU core units 101 are individually encoded by an encoder 124 described later. The flag "valid" is equivalent to the relation "L2_TC[2:0]"≠0, and not always required.

The L2 cache hit according to the non-subline method is determined for each WAY by producing, through an AND gate 123, the logic sum of "valid" and the result of matching between "PA_TAG[46:19]") and the address (pipe_PA[46:19]) of the data during the pipeline process by a matching circuit 122. A plurality of WAYs is controlled not to hit at the same time. When a given WAY hits, a selector 125 selects, for the WAY thus hit, "L2_TC[2:0]" as "L2_hit_L2_TC[2:0]", a selector 126 selects "L1_TC[2:0]" as "L1_hit_L1_TC[2:0]" and a selector 127 selects "CORE_ID[1:0]" as "L2_hit_CORE_ID[1:0]". Then, "L2_hit_WAY[1:0]" is encoded by the encoder 124 and used for pipeline control. The cache line with "valid" off is not held in the L2 cache 102i.

Next, refer to FIG. 9B. The subline system, in which "TAG_entry" providing an entry of the tag information held in the tag storage unit 102g is managed by the index "PA_index([18:8])", has the columns of "PA_TAG[46:19]", "sub_valid_0" (the valid flag of subline 0), "L2_TC_0[2:0]" (the flag indicating whether the L2 cache 102*i* holds the data of subline 0), "L1_TC_0[2:0]" (the flag indicating whether the L1 caches (the L1 instruction cache 101*b* and the L1 data cache 101*e*) hold the data of subline 0), "CORE_ID_0[1:0]" (the identification information of the CPU core unit 101 holding the data of subline 0 in the L1 cache), "sub_valid_1" (the valid flag of subline 1), "L2_TC_1[2:0]" (the flag indicating whether the L2 cache 102*i* holds the data of subline 1), "L1_TC_1[2:0]" (the flag indicating whether the L1 caches (the L1 instruction cache 101*b* and the L1 data cache 101*e*) hold the data of subline 1), "CORE_ID_1[1:0]" (the identification information of the CPU core unit 101 holding the data of subline 1 in the L1 cache), . . . , "sub_valid 3" (the valid flag of subline 3), "L2_TC_3[2:0]" (the flag indicating whether the L2 cache 102*i* holds the data of subline 3), "L1_TC_3[2:0]" (the flag indicating whether the L1 caches (the L1 instruction cache 101*b* and the L1 data cache 101*e*) hold the data of subline 3) and "CORE_ID_3[1:0]" (the identification information of the CPU core unit 101 holding the data of subline 3 in the L1 cache). A plurality of the CPU core units 101 are encoded individually by an encoder 131 described later, according by the combination of "L1_TC_0" and "CORE_ID_0", the combination of "L1_TC_1" and "CORE_ID_1", the combination of "L1_TC_2" and "CORE_ID_2" and the combination of "L1_TC_3" and "CORE_ID_3".

Specifically, in "TAG_entry" providing an entry of the tag information held in the tag storage unit 102*g*, "PA_TAG[46:19]" is shared by all the sublines. The other entries including "sub_valid", "L2_TC[2:0]", "L1_TC[2:0]" and "CORE_ID [1:0]", however, are held independently for each subline. At least one of the entries "sub_valid" of sublines, if in on state, is valid as a 256-byte cache line. "sub_valid" is equivalent to the relation "L2_TC"≠0 corresponding to a particular subline, and is not always required.

The L2 cache hit according to the subline method is determined for each WAY by producing, through an AND gate 130, the logic product of the result of matching between the address (pipe_PA[46:19]) of the data during the pipeline process and "PA_TAG[46:19]" by a matching circuit 128 on the one hand and the result of producing the logic product of all the entries "sub_valid" through an OR gate 129 on the other hand. When a given WAY hits, a selector 132 selects, for the WAY thus hit, "L2_TC_0[2:0]" as "L2_hit_L2_TC_0[2:0]", a selector 133 selects "L1_TC_0[2:0]" as "L2 hit_L1_TC_0 [2:0]", a selector 134 selects "CORE_ID_0[1:0]" as "L2_hit_CORE_ID_0[1:0]", . . . , a selector 135 selects "L2_TC_3[2:0]" as "L2_hit_L2_TC_3[2:0]", a selector 136 selects "L1_TC_3[2:0]" as "L2_hit_L1_TC_3[2:0]" and a selector 137 selects "CORE_ID_3[1:0]" as "L2_hit_CORE_ID_3[1:0]". Then, "L2_hit_WAY[1:0]" is encoded by the encoder 131 and used for pipeline control. The subline with "sub_valid" off is not held by the L2 cache 102*i*.

Also, both the non-subline and subline systems have the LRU information used for the replace_pipeline control by an index shared with "PA_TAG[46:19]". "L2_TC[2:0]" have six types of state including "I", "S", "E", "O", "W" and "M", and is encoded for each of "encode", "valid", "exclusive right", "writeback obligation" and "store obligation".

The subline system has the advantages described below. Specifically, since the cache line size is increased, the efficiency of the areal resources such as the L2 tag storage unit 102*g*, the L1-LB 101*i* and the L2-LB 102*h* is improved. Also, the unit of data transfer such as the 256-byte unit of all the cache lines or the 64-byte unit of the subline can be selected as required by the prevailing situation, resulting in an improved data transfer efficiency.

Figure 10A:
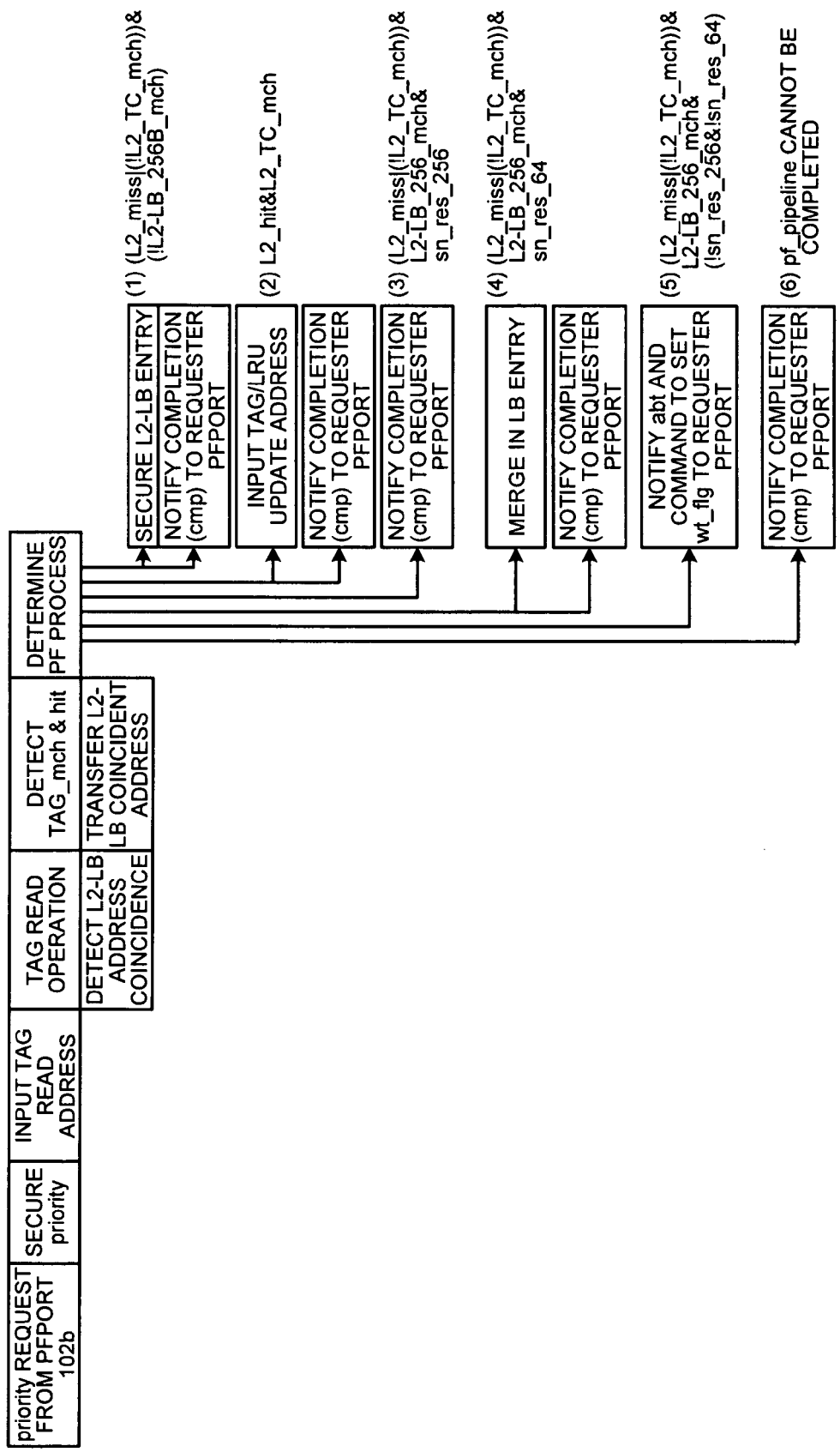
FIG. 10A is a diagram illustrating an outline (having no common PEFORT) of the pipeline process of the common L2 cache unit.

Next, an explanation is given about an outline of the pipeline process of the common L2 cache unit (in the absence of the common PFPORT). FIG. 10A is a diagram illustrating an outline of the pipeline process of the common L2 cache unit (in the absence of the common PFPORT).

As illustrated in FIG. 10A, the L2 pipeline processing unit 102*f*, upon acceptance of the priority request from the PFPORT 102*b*, secures the priority and is supplied with a TAG read address as an input. Then, reading the TAG and detecting the address matching with the L2-LB 102*h* are performed at the same time.

Then, the L2 pipeline processing unit 102*f* detects "TAG_mch" (tag match) and a hit (L2 cache hit) while at the same time transferring the address matched with the L2-LB 102*h*. After that, the PF process is executed based on the TAG_mch and hit detection result and the result of detection of address matching with the L2-LB 102*h*.

In the PF process, when a first condition is met that "the L2 cache miss occurs or "L2-TC" is off and the address fails to coincide with that of the L2-LB 102*h* on the 256-byte cache line (L2_miss|(!L2_TC_mch) & (!LB_256_mch))", then the entry is secured in the L2-LB 102*h* and the completion is notified to the requester PFPORT 102*b*.

When a second condition is met that "the L2 cache hit occurs and the address coincides with that of the L2-LB 102*h* on the 256-byte cache line (L2_hit & LB_256_mch)", then the updated address of "TAG" and "LRU" of the tag storage unit 102*g* is input and the completion (cmp) is notified to the requester PFPORT 102*b*.

When a third condition is met that "the L2 cache miss occurs or "L2_TC" is off and the address fails to coincide with that of the L2-LB 102*h* on the 256-byte cache line, but the sn_res_256 response exists (L2_miss|(!L2_TC_mch) & (!LB_256_mch) & sn_res_256)", then the completion (cmp) is notified to the requester PFPORT 102*b*.

When a fourth condition is met that "the L2 cache miss occurs or L2_TC is off and the address fails to coincide with that of the L2-LB 102*h* on the 256-byte cache line, but the sn_res_64 response exists (L2_miss|(!L2_TC_mch) & (!LB_256_mch) & sn_res_64)", then the particular subline of the entry is merged in the L2-LB 102*h*, and the completion (cmp) is notified to the requester PFPORT 102*b*.

When a fifth condition is met that "the L2 cache miss occurs or "L2_TC" is off and the address coincides with that of the L2-LB 102*h* on the 256-byte cache line, but neither the sn_res_256 response nor the sn_res_64 response exists (L2_miss|(!L2_TC_mch) & (!LB_256_mch) & (!sn_res_64 & !sn_res_256)", then the abortion (abt) is notified to the requester PFPORT 102*b* and a command is output to turn on "wt_flg" of the corresponding entry of the entry table 112.

When a sixth condition is met that "the PF pipeline process (pf_pipeline) fails to be completed for some reason or other", the abortion is notified to the requester PFPORT 102*b*.

Figure 10B:
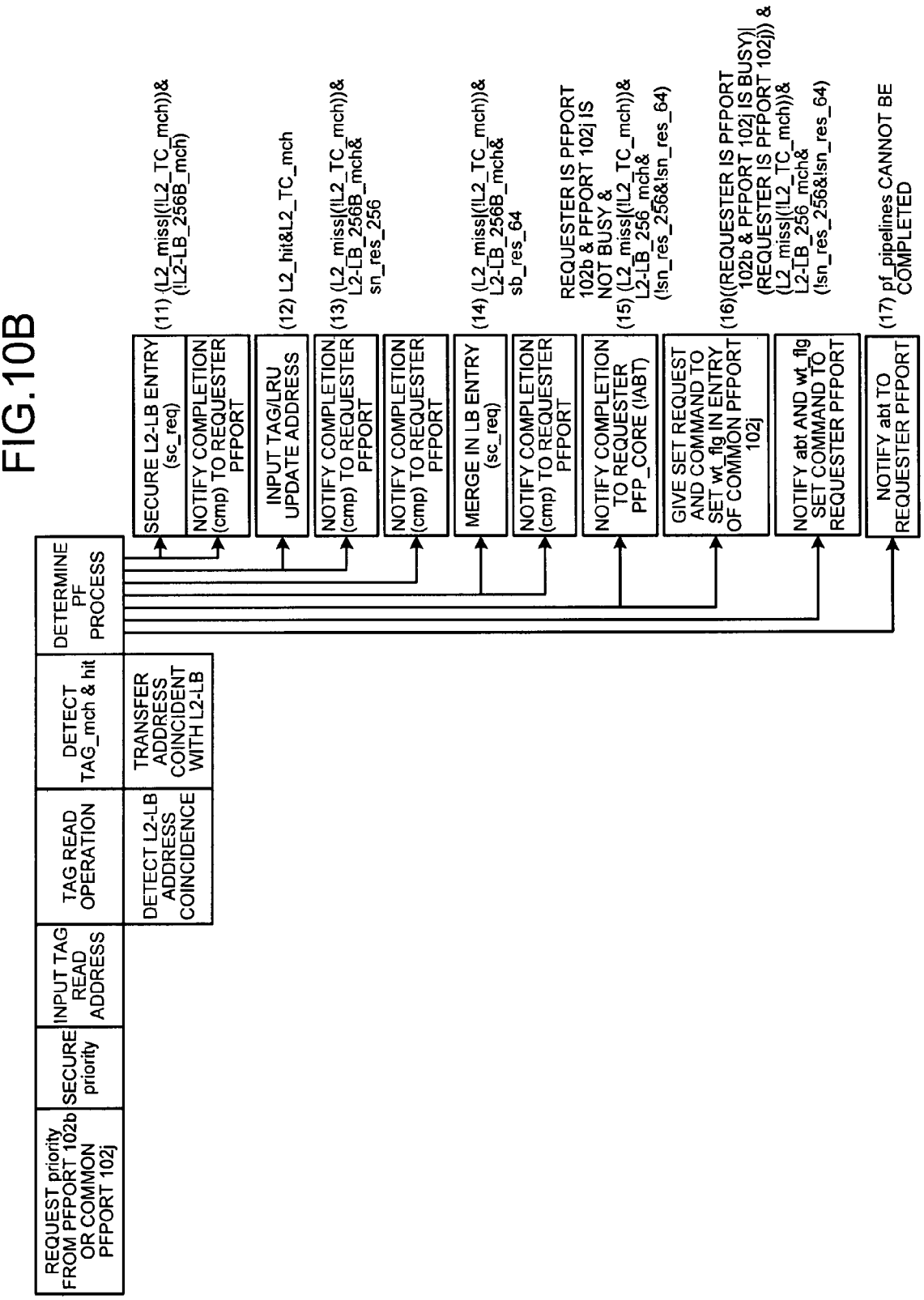
FIG. 10B is a diagram illustrating an outline (having the common PFPORT) of the pipeline process of the common L2 cache unit according to an embodiment.

Next, the pipeline process of the common L2 cache unit is briefly explained (in the presence of the common PFPORT). FIG. 10B is a diagram illustrating an outline of the pipeline process of the common L2 cache unit (in the presence of the common PFPORT).

As illustrated in FIG. 10B, the L2 pipeline processing unit 102*f*, upon acceptance of the priority request from the PFPORT 102*b* or the common PFPORT 102*j*, secures the priority and inputs the TAG read address. Then, the TAG read operation is performed while at the same time detecting the address matching with the L2-LB 102*h*.

Then, the L2 pipeline processing unit 102*f* detects "TAG_mch" (tag match) and a hit (L2 cache hit) operation while at the same time transferring the address matched with the L2-LB 102*h*. After that, the PF process is executed based on the result of TAG_mch and hit detection and the detection of address matching with the L2-LB 102*h*.

In the PF process, when an 11th condition is met that "the L2 cache miss occurs or "L2_TC" is off and the address fails to coincide with that of the L2-LB 102*h* on the 256-byte cache line (L2_miss|(!L2_TC_mch) & (!LB_256_mch)", then the entry is secured in the L2-LB 102*h* (sc_req) and the completion (cmp) is notified to the requester PFPORT 102*b*.

Also, when a 12th condition is met that "the L2 cache hit occurs and the address coincides with that of the L2-LB 102*h* on the 256-byte cache line (L2_hit & LB_256_mch)", then "TAG" and "LRU" of the tag storage unit 102*g* are updated, and the completion (cmp) is notified to the requester PFPORT 102*b*.

When a 13th condition is met that "the L2 cache miss occurs or "L2_TC" is off and the address fails to coincide with that of the L2-LB 102*h* on the 256-byte cache line but the sn_res_256 response exists (L2_miss|(!L2_TC_mch) & (!LB_256_mch) & sn_res_256)", then the completion (cmp) is notified to the requester PFPORT 102*b*.

When a 14th condition is met that "the L2 cache miss occurs or "L2_TC" is off and the address fails to coincide with that of the L2-LB 102*h* on the 256-byte cache line but the sn_res_64 response exists" (L2_miss|(!L2_TC_mch) & (!LB_256_mch) & sn_res_64)", then the particular subline of the entry is merged in the L2-LB 102*h* (sc_req) and the completion (cmp) is notified to the requester PFPORT 102*b*.

Further, when a 15th condition is met that "in the presence of a request from the PFPORT 102*b*, the common PFPORT 102*j* is not busy and the L2 cache miss occurs or 'L2_TC' is off while at the same time, the address coincides with that of the L2-LB 102*h* on the 256-byte cache line but neither the sn_res_256 response nor the sn_res_64 response exists (L2_miss|(!L2_TC_mch) & (!LB_256_mch) & sn_res_64 & !sn_res_256)", then the abortion (abt) is notified to the requester PFPORT 102*b*, the entry is moved to the entry table 120 of the common PFPORT 102*j* and a command is issued to turn on "wt_flg" of the corresponding entry of the entry table 112.

When a 16th condition is met that in the presence of a request from the PFPORT 102*b*, the common PFPORT 102*j* is busy or the L2 cache miss occurs or "L2_TC" is off and at the same time, the address coincides with that of the L2-LB 102*h* on the 256-byte cache line but, with the L2 cache miss, neither the sn_res_256 response nor the sn_res_64 response exists (L2_miss|(!L2_TC_mch) & (!LB_256_mch) & (!sn_res_64 & !sn_res_256)", then the abortion (abt) is notified to the requester PFPORT 102*b*, and a command is issued to turn on "wt_flg" of the corresponding entry of the entry table 112.

Also, when a 17th condition is met that "the PF pipeline process (pf_pipeline) cannot be completed", the abortion (abt) is notified to the requester PFPORT (the PFPORT 102*b* or the common PFPORT 102*j*).

Figure 10C:
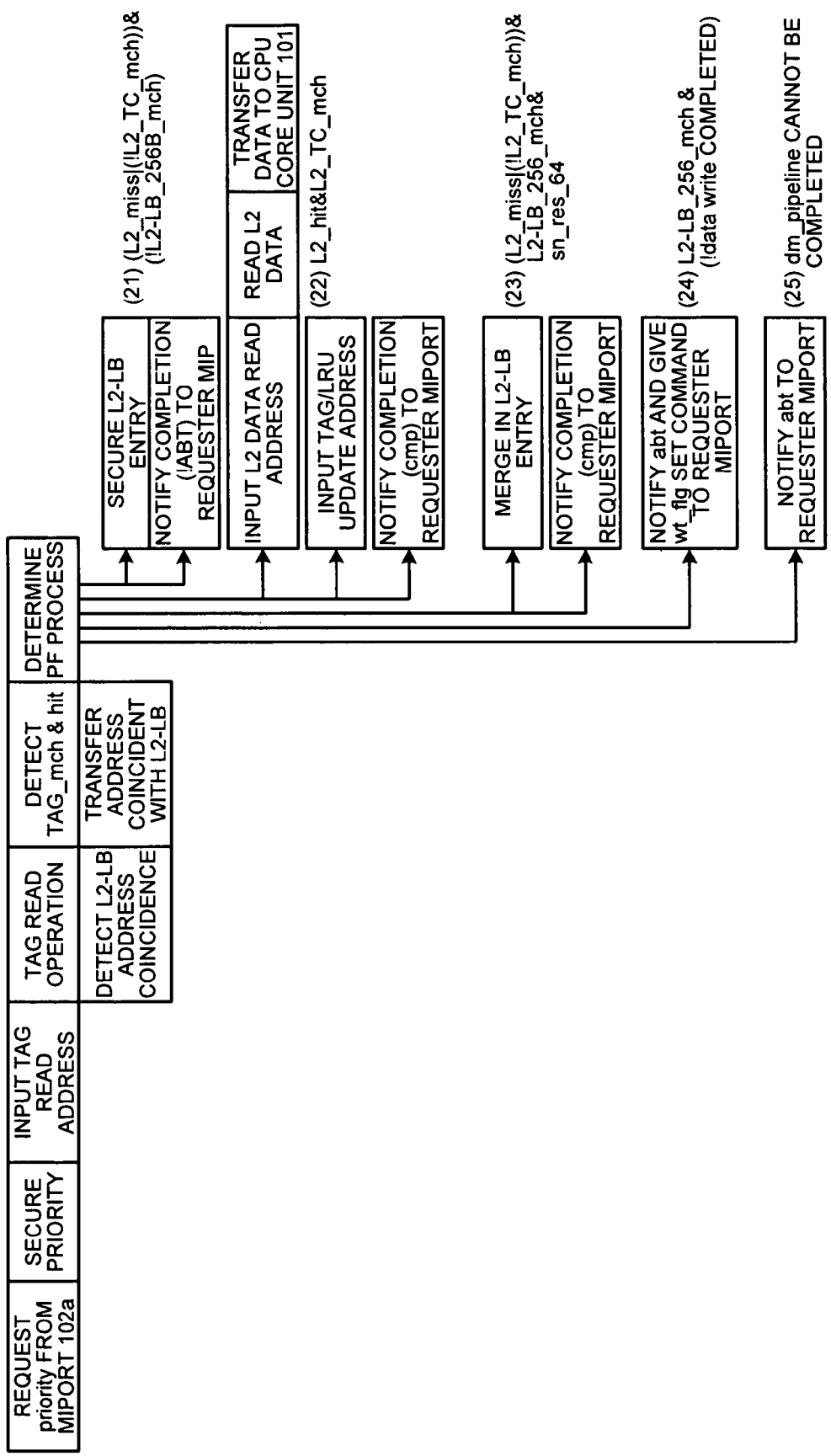
FIG. 10C is a diagram illustrating an outline of the DM pipeline process of the common L2 cache unit.

Next, an outline of the DM pipeline process of the common L2 cache unit is explained. FIG. 10C is a diagram illustrating an outline of the DM pipeline process of the common L2 cache unit.

As illustrated in FIG. 10C, the L2 pipeline processing unit 102*f*, upon acceptance of the priority request from the MIPORT 102*a*, secures the priority, and inputs the TAG read address. Then, the TAG read operation is performed while at the same time detecting the address matching with the L2-LB 102*h*.

Then, the L2 pipeline processing unit 102*f* detects "TAG_mch" (tag match) and a hit (L2 cache hit) while at the same time transferring the address coincident with the L2-LB 102*h*. Then, the PF process is executed based on the result of the TAG_mch and hit detection and the detection of the address matched with the L2-LB 102*h*.

In the PF process, when a 21st condition is met that "the L2 cache miss occurs or 'L2_TC' is off and the address fails to coincide with that of the L2-LB 102*h* on the 256-byte cache line (L2_miss|(!L2_TC_mch) & (!LB_256_mch))", then the entry is secured in the L2-LB 102*h* and the completion (cmp) notified to the requester MIPORT 102*a*.

Also, when a 22nd condition is met that "the L2 cache hit occurs and the address coincides with that of the L2-LB 102*h* on the 256-byte cache line (L2_hit & LB_256_mch)", then the read address for the data of the L2 cache 102*i* is input and the data is read from the L2 cache 102*i* and transferred to the L1 cache (the L1 instruction cache 101*b* or the L1 data cache 101*e*) of the CPU core unit 101. Then, the updated addresses for "TAG" and "LRU" of the tag storage unit 102*g* are input and the completion (cmp) is notified to the requester MIPORT 102*a*.

Also, when a 23rd condition is met that "the L2 cache miss occurs or "L2_TC" is off and the address coincides with that of the L2-LB 102*h* on the 256-byte cache line in the presence of the sn_res_256 response (L2_miss|(!L2_TC_mch) & (!LB_256_mch) & sn_res_256)", then the particular subline of the entry is merged in the L2-LB 102*h* and the completion (cmp) is notified to the requester MIPORT 102*a*.

When a 24th condition is met that "the address coincides with that of the L2-LB 102*h* on the 256-byte cache line but the data write operation is not yet completed (LB_256_mch & !(data_write_completed)", then the completion (cmp) is notified to the requester MIPORT 102*a* and a command is issued to turn on "wt_flg" of the corresponding entry in the entry table 112.

When a 25th condition is met that "the PF pipeline process (pf_pipeline) cannot be completed for some reason or other", the abortion (abt) is notified to the requester MIPORT 102*a*.

The basic difference between the PF pipeline process (PF_pipeline) for the PF request and the DM pipeline process (DM_pipeline) for the DM request lies in that the PF_pipeline process is intended for registration of the requested data in the L2 cache 102*i* while the DM-pipeline process is aimed at responding positively to the CPU core unit 101 with the requested address data.

Next, the L2 replace pipeline process of the common L2 cache unit is explained briefly. FIG. 10D is a diagram illustrating the L2 replace pipeline process of the common L2 cache unit. The L2 replace pipeline process (L2_replace_pipeline) invalidates the newly registered WAY before registration.

As illustrated in FIG. 10D, the L2 pipeline processing unit 102*f*, upon acceptance of the priority request from the L2-LB 102*h*, secures the priority and inputs the TAG read address. Then, the TAG read operation is performed while at the same time detecting the address matched with the L2-LB 102*h*.

Then, the L2 pipeline processing unit 102*f* detects "TAG_mch" (tag address matching) and a hit (L2 cache hit), followed by the replace_pipeline process determination. After that, the completion (cmp) or the abortion (abt) is notified to the L2-LB 102*h*, while at the same time inputting the updated "TAG" address. The L2-LB 102*h* then turns on the replace completion flag.

In the replace_pipeline process, the process of writing back to the DIMM 400 is executed for "L_TC(O,W,M)" requiring the writeback. Also, when "L1_TC"≠0 (i.e. the L1 cache hit), an invalidation request is issued to the CPU core unit 101 holding the data. The replace_pipeline process is started from the entry of the L2-LB 102h that has received the sn_res response.

Incidentally, the replace_pipeline process, like the PF_pipeline process and the DM_pipeline process, has a cycle to retrieve "TAG", but the result thereof is not necessarily used. When the entry of the L2-LB 102h is newly secured, however, the WAY determined by LRU, "index_address" and the subline are designated to invalidate the WAY. In this process, the process is executed as many times as the number of valid sublines, i.e. as many times as the maximum number of sublines (four times in the 4-subline system according to this embodiment).

Figure 10E:
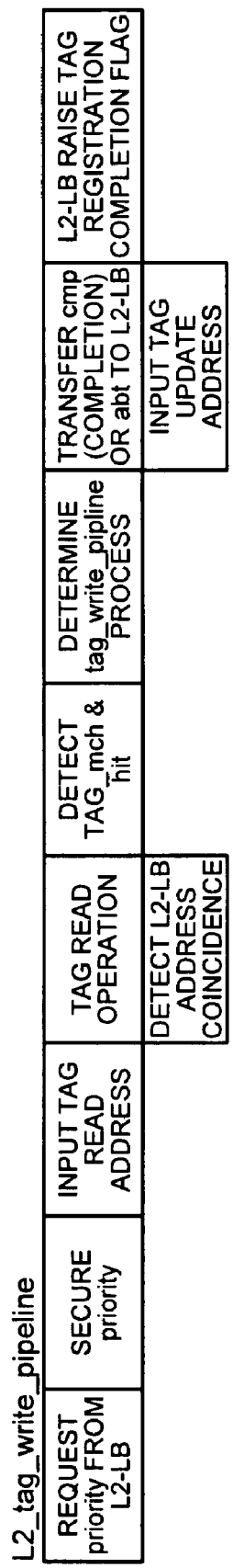
FIG. 10E is a diagram illustrating an outline of the L2 tag write pipeline process of the common L2 cache unit.

Next, an outline of the L2 tag write pipeline process of the common L2 cache unit is explained. FIG. 10E is a diagram illustrating an outline of the L2 tag write pipeline process of the common L2 cache unit. The L2 tag write pipeline process (L2_tag_write_pipeline) is for registering "TAG".

As illustrated in FIG. 10E, the L2 pipeline processing unit 102f, upon acceptance of the priority request from the L2-LB 102h, secures the priority and inputs the TAG read address. Then, the TAG read operation is performed while at the same time detecting the address matching with the L2-LB 102h.

Then, the L2 pipeline processing unit 102f detects "TAG_mch" (tag address matching) and a hit (L2 cache hit). Then, the tag pipeline process is determined, and the completion (cmp) or the abortion (abt) is notified to the L2-LB 102h, while inputting the updated "TAG" address. After that, the L2-LB 102h turns on the TAG registration completion flag.

The L2_tag_write_pipeline process is started from the entry of the L2-LB 102h that has received the header of the "dow" response. Like the PF_pipeline process or the DM_pipeline process, the L2_tag_write_pipeline process has a cycle to retrieve "TAG". Nevertheless, the result thereof is not necessarily used, and when the entry of the L2-LB 102h is newly secured, the WAY and index_address determined by LRU are designated, and "TAG" is newly registered in the L2 tag storage unit 102g. In the case of the sn_res_256 response, the "TAG" for 4 sublines is registered in one pipeline process.

Figure 10F:
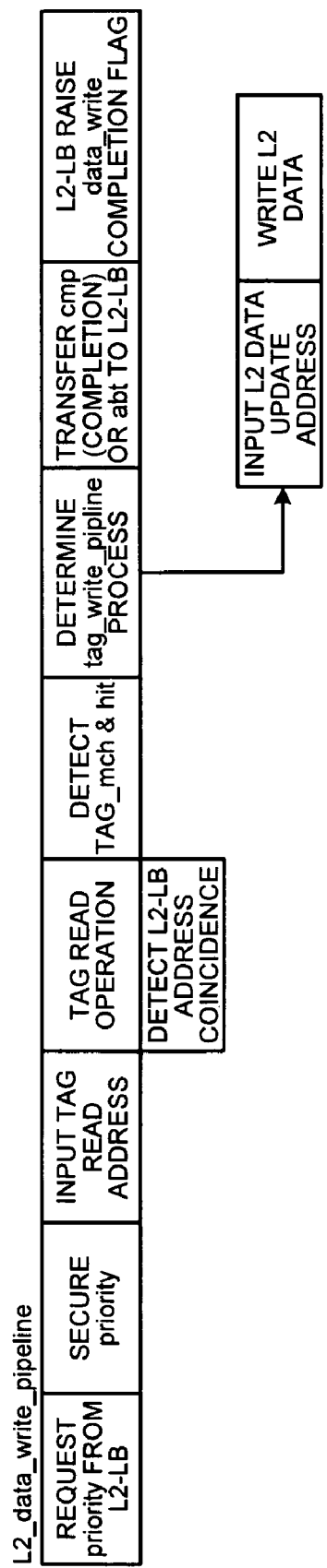
FIG. 10F is a diagram illustrating an outline of the L2 data write pipeline process of the common L2 cache unit.

Next, an outline of the L2 data write pipeline process of the common L2 cache unit is explained. FIG. 10F is a diagram illustrating an outline of the L2 write pipeline process of the common L2 cache unit. In the L2 data write pipeline process (L2_data write_pipeline), the data is written in the L2 cache 102i.

As illustrated in FIG. 10F, the L2 pipeline processing unit 102f, upon acceptance of the priority request from the L2-LB 102h, secures the priority, and inputs the TAG read address. Then, the TAG read operation and the operation of detecting the address matching with the L2-LB 102h are performed at the same time.

After that, the L2 pipeline processing unit 102f detects TAG_mch (tag address matching) process and a hit (L2 cache hit), followed by determining the data_write_pipeline process. Then, the completion (cmp) or the abortion (abt) is notified to the L2-LB 102h. Upon reception of this notice, the L2-LB 102h turns on the data_write registration completion flag.

The L2 pipeline processing unit 102f inputs the data update address of the L2 cache 102i and writes the data in the L2 cache data in parallel to the L2_data_write_pipeline process for determining the pipeline process result and the process of turning on the data write registration completion flag.

The data_write_pipeline process is started from the entry of the L2-LB 102h that has received the data portion of the "dow" response. This process is started as required at each end of subline data reception even during the data transfer.

The data_write_pipeline process, like the PF_pipeline process or the DM_pipeline process, has a cycle to retrieve "TAG". Nevertheless, the result of the retrieval is not necessarily used, and when the entry of the L2-LB 102h is secured, the WAY and "index_address" determined by LRU are designated and the data is written in the L2 cache 102i.

An embodiment of the invention is described above. This invention, however, is not limited to this embodiment, but may be variously embodied in different modifications without departing from the technical concept described in the scope of claims appended hereto. Also, the effects of this invention are not limited to those described in the embodiment.

Also, a part or the whole of the processes described above as executable automatically with reference to an embodiment may alternatively be executed manually, or the manual processes described above as executable manually with reference to an embodiment may alternatively be executed automatically using any well-known method. Further, the information including the processing steps, the control steps, the specific names and the various data and parameters can be arbitrarily changed unless otherwise specified.

Each component element of each device or unit illustrated in the drawings is a conceptual one, and not necessarily configured as illustrated in physical aspects. Specifically, the specific manner in which each device is distributed or integrated is not limited to the one illustrated in the drawings, but a part or the whole thereof may be functionally or physically distributed or integrated in an arbitrary unit in accordance with any of various loads or operating situations.

According to one aspect of this invention, an entry can be advantageously secured to store an uncompleted prefetch request to be issued to a prefetch processing unit.

According to another aspect of the invention, the wasteful situation can be advantageously avoided in which the prefetch request having failed to be completed is held in duplication in the common prefetch storage unit and issued to the prefetch processing unit.

According to still another aspect of the invention, the wasteful situation can be advantageously avoided in which the prefetch request having failed to be completed is held together with a load request in the common prefetch storage unit.

According to a further aspect of the invention, the resource utilization efficiency of the common prefetch storage unit is improved for an improved data transfer efficiency.

According to a further aspect of the invention, the resources in the prefetch storage unit are quickly released for a higher resource utilization efficiency.

According to a still further aspect of the invention, a prefetch request is recharged into the prefetch processing unit from the common prefetch storage unit, so that a load request having a coincident address can be completed quickly.

According to a yet further aspect of the invention, the prefetch process for the attribute required to be processed without fail can be quickly and positively can be completed advantageously.

According to a further aspect of the invention, when a prefetch request issued from the first or second prefetch storage unit to the prefetch processing unit is not completed, this prefetch request can be advantageously entered in the common prefetch storage unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A processor connected to a memory unit, the processor comprising:
a first processing unit;
a second processing unit; and
a common cache memory control unit that controls a common cache memory shared by the first and second processing units, wherein
the first processing unit has a first cache memory and issues a prefetch request to selected one of the common cache memory and the memory unit to read the data into the first cache memory beforehand,
the second processing unit has a second cache memory and issues a prefetch request to selected one of the common cache memory and the memory unit to read the data into the first cache memory beforehand, and
the common cache memory control unit includes
a prefetch processing unit that processes the prefetch request to the common cache memory,
a first prefetch memory unit that stores only the prefetch request from the first processing unit and issues the prefetch request from the first processing unit to the prefetch processing unit,
a second prefetch memory unit that stores only the prefetch request from the second processing unit and issues the prefetch request from the second processing unit to the prefetch processing unit, and
a common prefetch memory unit which, when the prefetch request issued from selected one of the first and second prefetch memory units to the prefetch processing unit cannot be completed, stores the uncompleted prefetch request in an entry and issues the uncompleted prefetch request to the prefetch processing unit.

2. The processor according to claim 1,
wherein when the prefetch request issued from selected one of the first and second prefetch memory units is not completed and the destination address and the type of the prefetch request held in the entry of the common prefetch memory unit are respectively coincident with the destination address and the type of the prefetch request of the uncompleted prefetch request, the uncompleted prefetch request is merged with the prefetch request held in the entry.

3. The processor according to claim 1,
wherein when the prefetch request issued from selected one of the first and second prefetch memory units to the prefetch processing unit is not completed and the destination address of the load request are respectively issued to selected one of the first and second cache memories and the type of the prefetch request coincide with the destination address and the type of the prefetch request of the uncompleted prefetch request, the prefetch processing unit cancels the uncompleted prefetch request from the entry.

4. The processor according to claim 1, wherein
a cache line of the first and second cache memories is a subline of the common cache memory and one Nth (N: integer greater than 2) as large as the cache line of the common cache memory, and
the first and second prefetch memory units and the common prefetch memory unit store a prefetched data corresponding to the prefetch request in units of subline in the entry of the common prefetch memory unit.

5. The processor according to claim 1, wherein
a cache line of the first and second cache memories is a subline of the common cache memory and one Nth (N: integer greater than 2) as large as the cache line of the common cache memory, and
the prefetch processing unit cancels the uncompleted prefetch request in units of subline from selected one of the first and second prefetch memory units.

6. The processor according to claim 1, wherein
the common cache memory control unit further includes a load request memory unit that stores the load request issued to selected one of the first and second cache memories, and
when the prefetch request issued to the prefetch processing unit from selected one of the first and second prefetch memory units is not completed and the destination address of the load request held in the load request memory unit coincides with the destination address of the uncompleted prefetch request, the prefetch processing unit stores the uncompleted fetch request in the entry of the common prefetch memory unit.

7. The processor according to claim 1,
wherein, when the prefetch request issued from selected one of the first and second prefetch memory units to the prefetch processing unit is not completed and the uncompleted prefetch request is an attribute requiring the execution of the prefetch process without fail, the common prefetch memory unit stores the uncompleted prefetch request in the entry of the common prefetch memory unit.

8. A method for controlling a processor connected to a memory unit and including first and second processing units and a common cache memory control unit that controls a common cache memory shared by the first and second processing units, the method comprising:
issuing a prefetch request to read the data into the first cache memory from the first processing unit having a first cache memory to selected one of the common cache memory and the memory unit;
issuing a prefetch request to read the data into the second cache memory from the second processing unit having a second cache memory to selected one of the common cache memory and the memory unit;
storing only the prefetch request from the first processing unit in a first prefetch memory unit;
issuing the prefetch request from the first processing unit to the prefetch processing unit of the common cache memory control unit;
storing only the prefetch request from the second processing unit in a second prefetch memory unit;
issuing the prefetch request from the second processing unit to the prefetch processing unit; and
storing the prefetch request issued from selected one of the first and second prefetch memory units to the prefetch processing unit in an entry of a common prefetch memory unit; and
issuing the prefetch request to the prefetch processing unit when the prefetch request stored in the entry of a common prefetch memory unit is uncompleted.

* * * * *